(12) United States Patent
Tada

(10) Patent No.: US 7,908,384 B2
(45) Date of Patent: Mar. 15, 2011

(54) INFORMATION PROCESSING SYSTEM, A MANAGEMENT APPARATUS, AN INFORMATION PROCESSING METHOD AND A MANAGEMENT METHOD

(75) Inventor: Yuki Tada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 12/258,602

(22) Filed: Oct. 27, 2008

(65) Prior Publication Data

US 2010/0049786 A1  Feb. 25, 2010

(30) Foreign Application Priority Data

Aug. 22, 2008 (JP) ................... 2008-213927

(51) Int. Cl.
  *G06F 15/16* (2006.01)
(52) U.S. Cl. ........ 709/227; 709/203; 709/228; 709/231; 709/219; 370/260; 705/51; 705/59
(58) Field of Classification Search ............ 709/227
  See application file for complete search history.

(56) References Cited

U.S. PATENT DOCUMENTS

| | | | | |
|---|---|---|---|---|
| 5,920,701 | A * | 7/1999 | Miller et al. | 709/228 |
| 7,143,121 | B2 * | 11/2006 | Mendonca et al. | 1/1 |
| 2007/0244818 | A1 * | 10/2007 | Tsuji et al. | 705/51 |
| 2007/0271329 | A1 | 11/2007 | Hirao et al. | |

FOREIGN PATENT DOCUMENTS

| | | |
|---|---|---|
| JP | 2001-216212 | 8/2001 |
| JP | 2002-183013 | 6/2002 |
| JP | 2005-063439 | 3/2005 |
| JP | 2005-157587 | 6/2005 |
| JP | 2005-352792 | 12/2005 |
| JP | 2006-086954 | 3/2006 |
| JP | 2006-155535 | 6/2006 |

OTHER PUBLICATIONS

Office Action in JP Appln. No. 2008-213927, mailed Jul. 8, 2010 (4 pages, in Japanese) ; Translation of Official Action (relevant part only).

* cited by examiner

*Primary Examiner* — Rupal D Dharia
*Assistant Examiner* — Hua Fan
(74) *Attorney, Agent, or Firm* — Antonelli, Terry, Stout & Kraus, LLP.

(57) ABSTRACT

An information processing system, a management apparatus, a program, an information processing method, and a management method which make it possible for the management apparatus to distribute contents to clients with high reliability are proposed. An information processing system includes one or a plurality of clients, and a management apparatus which manages the clients and distributes contents to the clients. The management apparatus distributes the contents to each of the clients of distribution subject of the contents at distribution time assigned to the client. The client opens a port at the distribution time on the basis of a script having the distribution time prescribed therein, and closes the port after receiving the contents.

8 Claims, 23 Drawing Sheets

FIG.2A

Definition of constants
Const NODEID = "00001"                          ID of node
Const DTIME = " 2008/05/24 16:04:30"            Preset time of distribution
Const CONTENTS = "Agent program"                Name of contents to be distributed
Const TIMEOUT=180                               Timeout time (seconds)

Declaration of global variables
Dim UserID              User ID of temporary account
Dim Password            Password of temporary account
Dim IPAddress           IP address of client
Dim CDateTime           Current time of client
Dim ScriptFilePath      Execution path of script file Generation processing of WSH object and file system object
Set WshShell = CreateObject ("Wscript.Shell")
Set ObjFSO = WScript.CreateObject("Scripting.FileSystemObject")

Argument check (whether it is post-processing execution order from installing program)
Set arg = WScript.Arguments
If arg.Count >= 1 Then
    If arg(0) <> "annihilate" Then
        flag = 1
    End If
End If
If flag <> 1 Then
    Main processing
    DisplayMessage()
    GetIPAddress()
    GetCDateTime()
    GetScriptFilePath()
    SendCompletionNotice NODEID, IPAddress, CdateTime, ScriptFilePath
    WaitUntilDTIME()
    Distribution start
    CreateCredentialInfo IPAddress, DTIME
    CreateTempAccount UserID, Password
    OpenPort()
    Wscript.sleep(TIMEOUT*1000)
End If
Post-processing (if it is post-processing execution order from installing program, only the following is executed.)
DeleteTempAccount UserID
ClosePort()
DeleteScriptFile()

(To be continued on FIG. 2B)

FIG.2B
(Continued from FIG. 2A)

```
Subroutines
Sub DisplayMessage()  Displaying message to prompt user to have already started client at distribution time
   message = "Since distribution of" &CONTENTS& "is started at" DTIME& ",start PC beforehand."
   MsgBox(message)
End Sub Sub GetIPAddress()
Acquiring IP address of client. Ipconfig command or WMI is utilized. Concrete source is omitted.
   IPAddress="Acquired IP address"
End Sub Sub GetCTime()    Acquiring current time of client
   CDateTime=Now
End Sub Sub GetScriptFilePath()    Acquiring execution path of script file
   ScriptFilePath=WScript.ScriptFullName
End Sub Sub SendCompletionNotice(NODEID, IPAddress, CdateTime, ScriptFilePath)
Notifying manager that advance preparation is completed. Protocol is TCP/IP or the like. Concrete source is omitted.
End Sub Sub WaitUntilDTIME()    Waiting until distribution preset time
   WaitTime = DateDiff("s", Now, DTIME)
   WScript.sleep(WaitTime*1000)
End Sub Sub CreateCredentialInfo(IPAddress, DTIME)
Generating authentication information (user ID and password) based on IP address & distribution time
Hash function or the like is used for generation. Concrete source is omitted.
   UserID="Generated ID"
   Password="Generated password"
End Sub Sub CreateTempAccount(UserID, Password )    Generating temporary account
   MsgBox(ID & Password)
   WshShell.Run "net user " & UserID & " " & Password & " /add ", 0, False
   WshShell.Run "net localgroup administrators " & UserID & " /add ", 0, False
End Sub Sub DeleteTemp,Account(UserID)    Deleting temporary account
   WshShell.Run "net user " & UserID & " /delete ", 0, False
End Sub Sub OpenPort()    Opening port to be used at the time of distribution
   WshShell.Run "netsh firewall set service REMOTEADMIN enable", 0, True
End Sub Sub ClosePort()    Closing port used at the time of distribution
   WshShell.Run "netsh firewall set service REMOTEADMIN disable", 0, True
End Sub Sub DeleteScriptFile()           Deleting itself
   ObjFSO.DeleteFile WScript.ScriptFullName,True
End Sub
```

FIG.3

To whom it may concern

Simultaneous distribution of an agent program is scheduled to be started from 2008/05/24 12:00.
In this connection, store a script file attached to the present mail in an arbitrary folder in the
desktop or the like and execute it, as advance preparation for accepting the distribution.
We are sorry to trouble you, but will you cooperate with us?
Matters to be attended to: The distribution time differs somewhat from PC to PC. Details of the
distribution time are displayed by executing the attached script file.

Information system department

FIG.4

| NODE ID (301) | IP ADDRESS (302) | MAIL ADDRESS (303) | OS (304) | ASSIGNED DISTRIBUTION OBJECT ID (305) | DISTRIBUTION TIME (306) | ... |
|---|---|---|---|---|---|---|
| 00001 | 10.208.95.1 | aaa@xx.hitachi.com | Windows XP | 10001 | 2008/05/19 12:00:00 | ... |
| 00002 | 10.208.95.2 | bbb@xx.hitachi.com | Windows Vista | 10001 | 2008/05/19 12:03:00 | ... |
| 00003 | 10.208.95.3 | ccc@xx.hitachi.com | Windows Server 2008 | 10001 | 2008/05/19 12:06:00 | ... |
| ... | ... | ... | ... | ... | ... | ... |

| TIME DIFFERENCE (307) | SCRIPT STORAGE PATH (308) | SCRIPT FILE EXECUTION PATH (309) | STATUS (310) | RESULT CODE (311) |
|---|---|---|---|---|
| 70 | C:¥Script¥00001¥10001¥Setting.vbs | C:¥Deploy¥Setting.vbs | NORMAL TERMINATION | 0 |
| -25 | C:¥Script¥00002¥10001¥Setting.vbs | D:¥20080528¥Setting.vbs | ERROR TERMINATION | 2 |
| 47 | C:¥Script¥00003¥10001¥Setting.vbs | C:¥Deploy¥Setting.vbs | WAITING FOR EXECUTION | -1 |
| ... | ... | ... | ... | ... |

FIG.5

| DISTRIBUTION OBJECT ID (401) | DISTRIBUTION OBJECT NAME (402) | DISTRIBUTION START DATE AND HOUR (403) | NUMBER OF REMAINING NODES (404) | STATUS (405) |
|---|---|---|---|---|
| 10001 | AGENT SOFTWARE A | 2008/05/19 12:30 | 0 | NORMAL TERMINATION |
| 10002 | STORAGE MANAGEMENT SOFTWARE B | 2008/05/20 14:00 | 50 | UNDER EXECUTION |
| ... | ... | ... | ... | ... |

| DISTRIBUTION OBJECT ID | CLASSIFIED-BY-OS PATH | | |
|---|---|---|---|
| | PATH FOR WINDOWS XP (502) | PATH FOR WINDOWS VISTA (503) | PATH FOR WINDOWS SERVER 2008 (504) |
| 10001 | C:¥DeployFile¥10001¥Install_xp.zip | C:¥DeployFile¥10001¥Install_vista.zip | C:¥DeployFile¥10001¥Install_srv2008.zip |
| 10002 | C:¥DeployFile¥10002¥Install_xp.zip | C:¥DeployFile¥10002¥Install_vista.zip | C:¥DeployFile¥10002¥Install_srv2008.zip |
| ... | ... | ... | ... |

| NODE ID (601) | TEMPORARY ACCOUNT ID (602) | TEMPORARY ACCOUNT PASSWORD (603) |
|---|---|---|
| 00005 | Asdm9032zfasw32 | K76fajo8p1 |

Client001 : 2008/05/19 12:00:00

Client002 : 2008/05/19 12:03:00

⋮ ⋮

Client100 : 2008/05/19 16:57:00

INFORMATION PROCESSING SYSTEM, A MANAGEMENT APPARATUS, AN INFORMATION PROCESSING METHOD AND A MANAGEMENT METHOD

INCORPORATION BY REFERENCE

The present application claims priority from Japanese application JP 2008-213927 filed on Aug. 22, 2008, the content of which is hereby incorporated by reference into this application.

BACKGROUND OF THE INVENTION

The present invention relates to an information processing system, a management apparatus, a program, an information processing method and a management method. The present invention is suitable for application to, for example, an information processing system including a management server and a plurality of clients.

As a conventional method for conducting agent-less push distribution of software from the management server to clients, there is a method of utilizing a remote management interface such as WMI (Windows (trade mark) Management Instrumentation). This method is used widely as a method especially for conducting push distribution of an agent (a management program installed in clients to conduct various managements for clients) itself to clients.

A method of collecting inventory information of respective terminals by using the WMI without an agent and distributing an individual information search program on the basis of the inventory information is disclosed in JP-A-2006-155535. Furthermore, a method of installing a client agent in a new client by utilizing a self-multiplication function is disclosed in JP-A-2005-157587.

SUMMARY OF THE INVENTION

When conducting push distribution of software to clients by utilizing the remote management interface such as the WMI, it is necessary to continue to open a port having a security problem (DCOM (Distributed Component Object Model) port in the WMI) on the client side. There is a problem that defense against malicious access cannot be conducted during that time.

The present invention has been made in view of circumstances heretofore described. An object of the present invention is to provide an information processing system, a management apparatus, a program, an information processing method and a management method which make it possible to distribute contents from the management apparatus to clients with high reliability.

In order to achieve the object, in accordance with a first aspect of the present invention, an information processing system including one or a plurality of clients and a management apparatus which manages the clients and distributes contents to the clients, wherein the management apparatus distributes the contents to each of the clients of distribution subject of the contents at distribution time assigned to the client, and the client opens a port at the distribution time on the basis of a script having the distribution time prescribed therein, and closes the port after receiving the contents.

In accordance with a second aspect of the present invention, a management apparatus which distributes contents to one or a plurality of clients includes a manager controller for assigning the distribution time of the contents to each of the clients in accordance with distribution start time of the contents specified by external manipulation, a contents script file generator for generating a file of the script which corresponds to each of the clients and which prescribes the assigned distribution time, and a mail processor for distributing the generated file of the script to the corresponding client by using electronic mail before the distribution time of the contents prescribed in the script.

In accordance with a third aspect of the present invention, a program which causes an information processing apparatus to execute processing includes a first step of opening a port connected to an external apparatus at previously prescribed distribution time, and a second step of closing the port after receiving contents transmitted from the external apparatus at the distribution time.

In accordance with a fourth aspect of the present invention, an information processing method in an information processing system including one or a plurality of clients and a management apparatus which manages the clients and distributes contents to the clients includes a first step of causing the management apparatus to distribute the contents to each of the clients of distribution subject of the contents at distribution time assigned to the client and causing the client to open a port at the distribution time on the basis of a script having the distribution time prescribed therein, and a second step of causing the client to close the port after receiving the contents.

In accordance with a fifth aspect of the present invention, a management method for distributing contents to one or a plurality of clients includes a first step of assigning the distribution time of the contents to each of the clients in accordance with distribution start time of the contents specified by external manipulation, a second step of generating a file of the script which corresponds to each of the clients and which prescribes the assigned distribution time, and a third step of distributing the generated file of the script to the corresponding client by using electronic mail before the distribution time of the contents prescribed in the script.

In accordance with a sixth aspect of the present invention, an information processing method includes a first step of opening a port connected to an external apparatus at previously prescribed distribution time, and a second step of closing the port after receiving contents transmitted from the external apparatus at the distribution time.

According to the present invention, the port of each client is opened and closed only at distribution time assigned to the client. As a result, contents can be distributed with a high security property. Thus, an information processing system, a management apparatus, a program, an information processing method, and a management method which make it possible for the management apparatus to distribute contents to the clients with high reliability can be implemented.

Other objects, features and advantages of the invention will become apparent from the following description of the embodiments of the invention taken in conjunction with the accompanying drawings.

BRIEF DESCRIPTION OF THE DRAWINGS

FIG. 2A is a concept diagram for explaining a script file;

FIG. 2B is a concept diagram for explaining a script file;

FIG. 3 is a diagram for explaining a mail message file;

FIG. 4 is a concept diagram showing a configuration of a client management table conceptually;

FIG. 5 is a concept diagram showing a configuration of a distribution object management table conceptually;

FIG. 6 is a concept diagram showing a configuration of an installing medium management table conceptually;

FIG. 7 is a concept diagram showing a configuration of a temporary account authentication information buffer conceptually;

FIG. 11 is a diagram for explaining concrete processing contents of the manager controller in the management server concerning the pre-processing;

DESCRIPTION OF THE INVENTION

Hereafter, an embodiment of the present invention will be described in detail with reference to the drawings.

Figure 1:
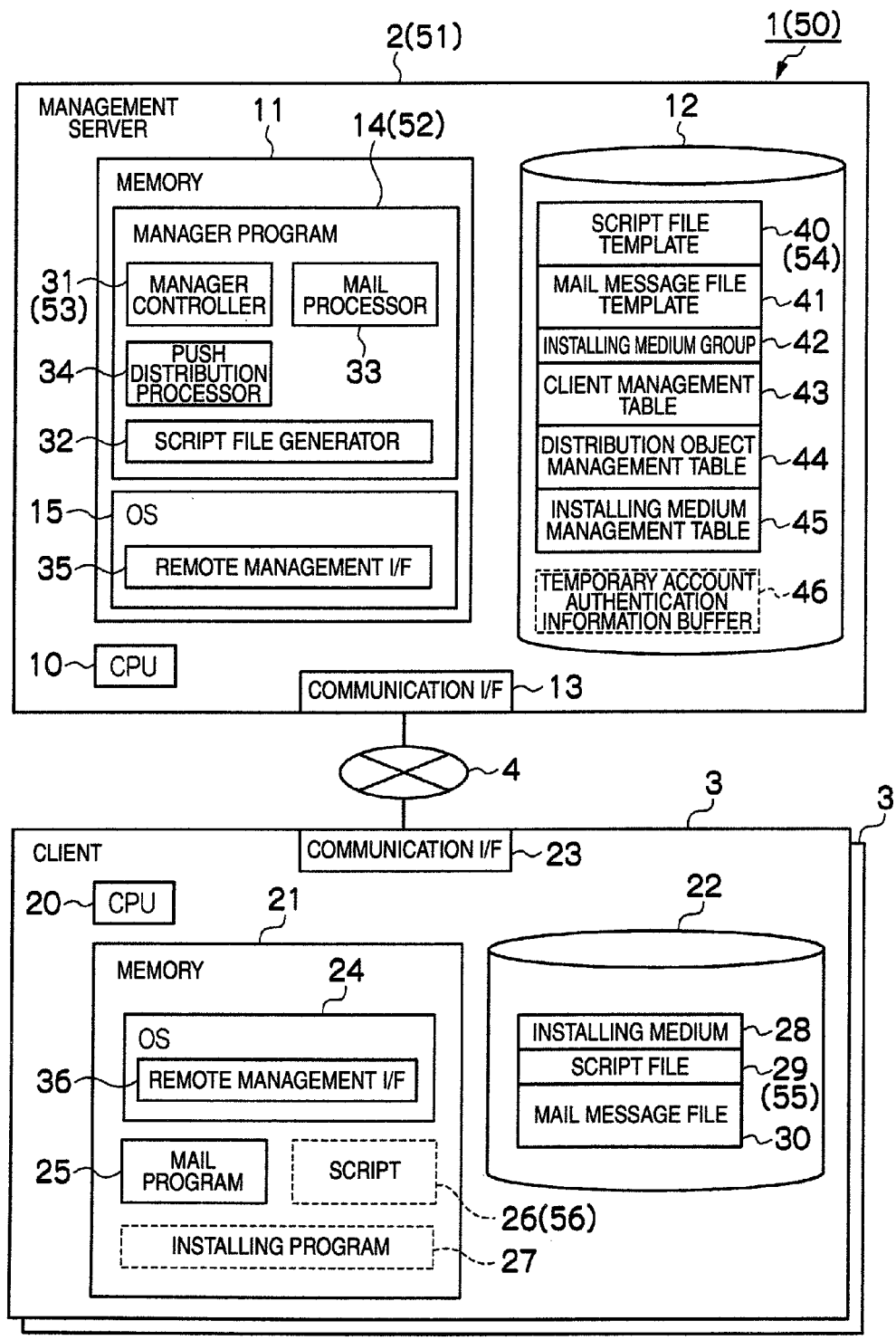
FIG. 1 is a block diagram showing a configuration of an information processing system according to first and second embodiments.

(1) First Embodiment (1-1) Configuration of Information Processing System According to Present Embodiment In FIG. 1, reference numeral 1 denotes an information processing system according to the present embodiment as a whole. The information processing system 1 is formed by connecting a plurality of clients 3 to a management server 2 via a network 4.

The management server 2 is a computer apparatus including a CPU (Central Processor) 10, a memory 11, a hard disk device 12 and a communication interface 13. For example, the management server 2 is formed of a personal computer, a work station, a main frame, or the like.

The CPU 10 is a processor which takes charge of operation control over the whole management server 2. The memory 11 is used not only as a work memory for the CPU 10 but also to store various programs. For example, a manager program 14 and an OS (Operating System) 15 read out from the hard disk device 12 when the management server 2 is started are stored in the memory 11.

Various programs and various data are stored in the hard disk device 12. A script file template 40, a mail message file template 41, an installing medium group 42, a client management table 43, a distribution object management table 44 and an installing medium management table 45, which will be described later, are also stored in the hard disk device 12. A temporary account authentication information buffer 46 described later is also stored in a storage region provided by the hard disk device 12.

The communication interface 13 conducts processing such as protocol conversion required when the management server 2 communicates with clients 3 via the network 4. The communication interface 13 includes one port or a plurality of ports. The communication interface 13 is connected to the network 4 via the ports. Each of the ports included in the communication interface 13 is provided with a network address, such as a WWN (World Wide Name) address or an IP (Internet Protocol) address, to uniquely identify the port on the network 4.

The network 4 is formed of a SAN (Storage Area Network), a LAN (Local Area Network), Internet, public lines or private lines. For example, if the network 4 is a SAN, the communication between the management server 2 and a client 3 via the network 4 is conducted in accordance with a fiber channel protocol. If the network 4 is a LAN or the Internet, the communication is conducted in accordance with the TCP/IP (Transmission Control Protocol/Internet Protocol) protocol.

In the same way as the management server 2, the client 3 is a computer apparatus including a CPU 20, a memory 21, a hard disk device 22 and a communication interface 23. The client 3 is formed of, for example, a personal computer, a work station, a main frame, or the like. The CPU 20, the memory 21 and the hard disk device 22 have the same functions as those of counterparts in the management server 2.

Besides an OS 24 and a mail program 25 read out from the hard disk device 22 when the client 3 is started, however, a script 26 which will be described later and an installing program 27 transmitted from the management server 2 and described later are also stored in the memory 21 in the client 3. Besides various application programs, an installing medium 28, a script file 29 and a mail message file 30 transmitted from the management server 2 and described later are stored in the hard disk device 22 in the client 3.

In the same way as the communication interface 13, the communication interface 23 has a function of conducting processing such as protocol conversion required when the client 3 communicates with the management server 2 via the network 4. The communication interface 13 has one port or a plurality of ports. The communication interface 13 is connected to the network 4 via the ports. Each of the ports included in the communication interface 23 is provided with a network address, such as a WWN address or an IP address, to uniquely identify the port on the network 4.

(1-2) Software Distribution Scheme According to Present Embodiment (1-2-1) Outline of Software Distribution Scheme According to Present Embodiment A software distribution scheme used to distribute software from the management server 2 to each client 3 in the present information processing system 1 will now be described. The information processing system 1 according to the present embodiment has a feature that software is distributed from the management server 2 to each client 3 in accordance with a procedure described hereafter. In the ensuing description, it is supposed that a distribution object is an agent program.

(a) Pre-Processing (a-1) First, a managing person gives an agent distribution order to the management server 2 to specify an agent program to be distributed, its distribution destination, and start date and hour of distribution (hereafter referred to as distribution start date and hour).

(a-2) The management server 2 assigns distribution time every client 3 of distribution destination according to distribution start date and hour specified by the managing person. The management server 2 generates a script file 29 having a function of opening and closing a port and generating and deleting a temporary account at assigned distribution time, every client 3, attaches the generated script file 29 to a predetermined mail message file 30, and sends the resultant mail message file 30 to a corresponding client 3.

By the way, the script means a simple program made executable simply by omitting the work of conversion to a machine language. For example, in Windows (trade mark), VBScript corresponds to the script. In Unix (trade mark), shell script corresponds to the script. Hereafter, a script viewed as a file is referred to as "script file" and a script viewed as a program loaded into a memory and brought into its execution state is referred to as "script."

(a-3) Upon receiving the mail message file 30, the client 3 executes the script file 29 attached to the mail message file according to the user's manipulation. The script 26 executed at this time notifies the user of agent program distribution time by using a message dialog and prompts the user to have already started the client 3 at that distribution time.

(a-4) Thereafter, the management server 2 and the client 3 wait until the agent program distribution time is reached.

(b) Distribution Execution Processing (b-1) Upon arrival at the agent program distribution time, the client 3 generates a temporary account in accordance with a predetermined generation rule described in the script file 29, and opens a port to be used for reception of an agent program sent from the management server 2.

(b-2) At this time, the management server 2 generates the same temporary account as that on the client 3 side in accordance with the same generation rule as that on the client 3 side, and conducts remote connection to the client 3 by using the generated temporary account. And the management server 2 collects OS information (classification information of the OS 24 mounted on the client 3) from the remote-connected client 3, judges a classification of an agent program which conforms to the OS 24 in the client 3, and push-distributes an agent program of that classification.

(b-3) The script 26 in the client 3 to which the agent program is push-distributed installs the agent program. After the installing is completed, the script 26 (FIG. 1) deletes the temporary account, closes the opened port, and then deletes itself.

(1-2-2) Configuration of Management Server and Client Concerning Present Software Distribution Scheme As means for implementing the software distribution scheme according to the present embodiment as heretofore described, the manager program 14 in the management server 2 includes a manager controller 31, a script file generator 32, a mail processor 33 and a push distribution processor 34, and the OS 15 includes a remote management interface 35, as shown in FIG. 1.

The script file generator 32 is a program for generating the script file 29 every client 3 in (a-2) of the pre-processing described above. The mail processor 33 is a program for generating the corresponding mail message file 30 in (a-2) of the pre-processing and distributing the generated mail message file 30 to the client 3 by using electronic mail (hereafter referred to simply as mail).

The push distribution processor 34 is a program for push-distributing the agent program to the client 3 in (b-2) of the distribution execution processing described above. The manager controller 31 is a program for executing processing which is included in various kinds of processing concerning the present software distribution scheme and which is other than the above described processing based on the script file generator 32, the mail processor 33 and the push distribution processor 34.

The remote management interface 35 in the OS 15 is an interface used when the management server 2 conducts remote connection to the client 3.

Hereafter, it is described that the "program" executes various kinds of processing. As a matter of course, however, the CPU 10 actually executes corresponding processing on the basis of the program.

On the other hand, the script file template 40, the mail message file template 41, the installing medium group 42, the client management table 43, the distribution object management table 44 and the installing medium management table 45 are stored in the hard disk device 12 in the management server 2 as shown in FIG. 1. In addition, the temporary account authentication information buffer 46 is provided.

Among them, the script file template 40 is a template of the script file 29 sent from the management server 2 to the client 3 in the (a-2) of the pre-processing described above. The script file template 40 has a configuration shown in, for example, FIGS. 2A and 2B. In FIGS. 2A and 2B, a part underlined with one solid line is a part for storing corresponding information in association with a client 3 which becomes a distribution destination of the script file 29 when generating the script file 29. A part underlined with a wavy line is a part for storing a result obtained by conducting each processing. In addition, a part underlined with a double line is information described for explaining its counterpart, and it is not described in the actual program.

The mail message file template 41 is a template of the mail message file 30 sent from the management server 2 to the client 3 in (a-2) of the pre-processing described above. Mail having, for example, a compound shown in FIG. 3 is generated on the basis of the mail message file template 41. In FIG. 3, an underlined part is a part for storing corresponding information when the mail is sent from the management server 2 to the client 3.

The installing medium group 42 is formed of installing media 28 of a plurality of kinds respectively corresponding to classifications of the OS (for example, Windows XP (trade mark), Windows Vista (trade mark) and Windows Server 2008 (trade mark)) which are installed in the client 3 or which have a possibility of being installed in the client 3. Here, the installing medium 28 is a set of files required to install a distributed agent program in the client 3 (which includes an installing program and a distribution object itself). Specifically, the installing medium 28 is formed of archive data such as a file of a ZIP form.

By the way, the installing program refers to a program used to install a distribution object (here, an agent program). In the present embodiment, an installing program which can be installed without requiring an input from a GUI (Graphical User Interface), i.e., which can be silent-installed is supposed. Specifically, data in the Windows (trade mark) Installer form is supposed.

The client management table 43 is a table for managing the situation of distribution of distribution objects (agent programs) to each client 3. The client management table 43 includes a node ID column 43A, an IP address column 43B, a mail address column 43C, an OS column 43D, an assigned distribution object ID column 43E, a distribution time column 43F, a time difference column 43G, a script storage path column 43H, a script file execution path column 43I, a status column 43J and a result code column 43K.

An ID given to a client 3 to which a distribution object is distributed or is to be distributed (hereafter referred to as node ID) is stored in the node ID column 43A. An IP address to be used to access the client 3 is stored in the IP address column 43B.

A mail address of the client 3 is stored in the mail address column 43C. A kind of an OS mounted on the client 3 is stored in the OS column 43D. In addition, an ID given to a distribution object which is already distributed to the client 3 (hereafter referred to as distribution object ID) is stored in the assigned distribution object ID column 43E. Distribution time when the distributed distribution object is distributed to the client 3 is stored in the distribution time column 43F.

A difference between internal time of the client 3 and internal time of the management server 2 (hereafter referred to as time difference) is stored in the time difference column 43G by taking a second as the unit. If the internal time of the management server 2 is later than the internal time of the client 3, the time difference assumes a minus value. The time difference is 0 in its initial value.

In addition, a path name which leads to a storage location of the script file 29 (FIG. 1) generated for the client 3 in the management server 2 is stored in the script storage path column 43H. A storage location of the corresponding script file 29 in the corresponding client 3 is stored in the script file execution path column 43I. A status which represents the distribution situation of a corresponding distribution object to the client 3 is stored in the status column 43J.

In the case of the present embodiment, there are five kinds of status: "in preparation", "waiting for execution", "under execution", "normal termination" and "error termination". Among them, "in preparation" represents that the situation of distribution of a distribution object to the client 3 is in the above-described pre-processing step. "Waiting for execution" represents that the distribution situation is in a time period between the end of the pre-processing step and start of distribution of the distribution object. "Under execution" represents that the distribution processing of the distribution object is being executed. "Normal termination" represents that the distribution of the distribution object has been completed normally. In addition, "error termination" represents that an error has occurred during the distribution processing of the distribution object. By the way, the status is "in preparation" in its initial value.

A code which represents a result of distribution processing of a distribution object to the client 3 (hereafter referred to as result code) is stored in the result code column 43K. In the case of the present embodiment, there are four kinds of result code: "−1" to "2." Among them, "−1" represents that the distribution processing is not completed. Result code "0" represents that the distribution processing of the distribution object is terminated normally. Result code "1" represents that authentication processing at the time of remote connection to the client 3 has failed. Result code "2" represents that installing processing of the script 26 or the distribution object (agent program) has failed. The result code is "−1" in its initial value.

In the client management table 43, there are entries for each distribution object. For example, when distributing a plurality of distribution objects to one client 3, as many entries as the number of distribution objects exist for the same node ID. Except for a special environment such as an AD (Active Directory) environment, in the initial state, information is stored only in the node ID column 43A and the mail address column 43C of each entry.

The distribution object management table 44 is a table for managing a distribution object distributed to the client 3 and its distribution situation. As shown in FIG. 5, the distribution object management table 44 has a distribution object ID column 44A, a distribution object name column 44B, a distribution start date and hour column 44C, a number of remaining nodes column 44D and a status column 44E.

An ID of a distribution object which is retained in the hard disk device 12 in the management server 2 and which is scheduled to be distributed, which is being distributed, or which has been distributed to the client is stored in the distribution object ID column 44A. A name of the distribution object is stored in the distribution object name column 44B.

A scheduled date and hour when distribution of the distribution object is to be started, or date and hour when distribution of the distribution object has been started is stored in the distribution start date and hour column 44C. The number of clients 3 for which distribution processing has not been completed among clients 3 to which the distribution object should be distributed is stored in the number of remaining nodes column 44D.

A status representing the distribution situation of the distribution object is stored in the status column 44E. In the case of the present embodiment, there are four kinds of status: "waiting for execution", "under execution", "normal termination" and "error termination". Among them, "waiting for execution" represents a state in which a distribution order issued by the manager is waited. "Under execution" represents that the distribution object is under distribution processing. "Normal termination" represents that the distribution processing has been completed normally. "Error termination" represents that an error has occurred during the distribution processing.

The installing medium management table 45 is a table for managing a path to an installing medium 28 (FIG. 1) which conforms to each distribution and each classification of an OS mounted on the client 3 and which is included in various installing media 28 stored in the hard disk device 12 in the management server 2. As shown in FIG. 6, the installing medium management table 45 has a distribution object ID column 45A and a classified-by-OS path column 45B. A distribution object ID of a distribution object stored in the hard disk device 12 in the management server 2 is stored in the distribution object ID column 45A.

In the classified-by-OS path column 45B, path columns 45C are provided so as to respectively correspond to classes of OSs which are mounted on the client 3 or which have a possibility of being on the client 3. An access path to an installing medium 28 which is included in various installing media 28 stored in the hard disk device 12 and which is associated with an OS of the corresponding class is stored in each path column 45C.

For example, as for an agent program having a distribution object ID of "1001" in the example shown in FIG. 6, installing media 28 for the Windows XP (trade mark), Windows Vista (trade mark) and Windows Server 2008 (trade mark) are previously prepared (previously stored in the hard disk device). For example, it is indicated that an access path to an installing medium 28 for the Windows XP is "C:DeployFile¥10001¥Install_xp.zip".

In addition, the temporary account authentication information buffer 46 is a storage area for temporarily storing authentication information (an ID and a password) of a temporary account generated by the manager program 14 in the management server 2. As shown in FIG. 7, the temporary account authentication information buffer 46 has a node ID column 46A, a temporary account ID column 46B and a temporary account password column 46C.

A node ID of a client 3 which becomes a subject of a temporary account generated at that time is stored in the node ID column 46A. An ID of the generated temporary account is stored in the temporary account ID column 46B. A password of the generated temporary account is stored in the temporary account password column 46C.

In the OS 24 in the client 3 as well, a remote management interface 36 is provided to function as an interface when the management server 2 conducts remote connection to the client 3.

(1-2-3) Details of Pre-Processing and Distribution Execution Processing

Figure 8:
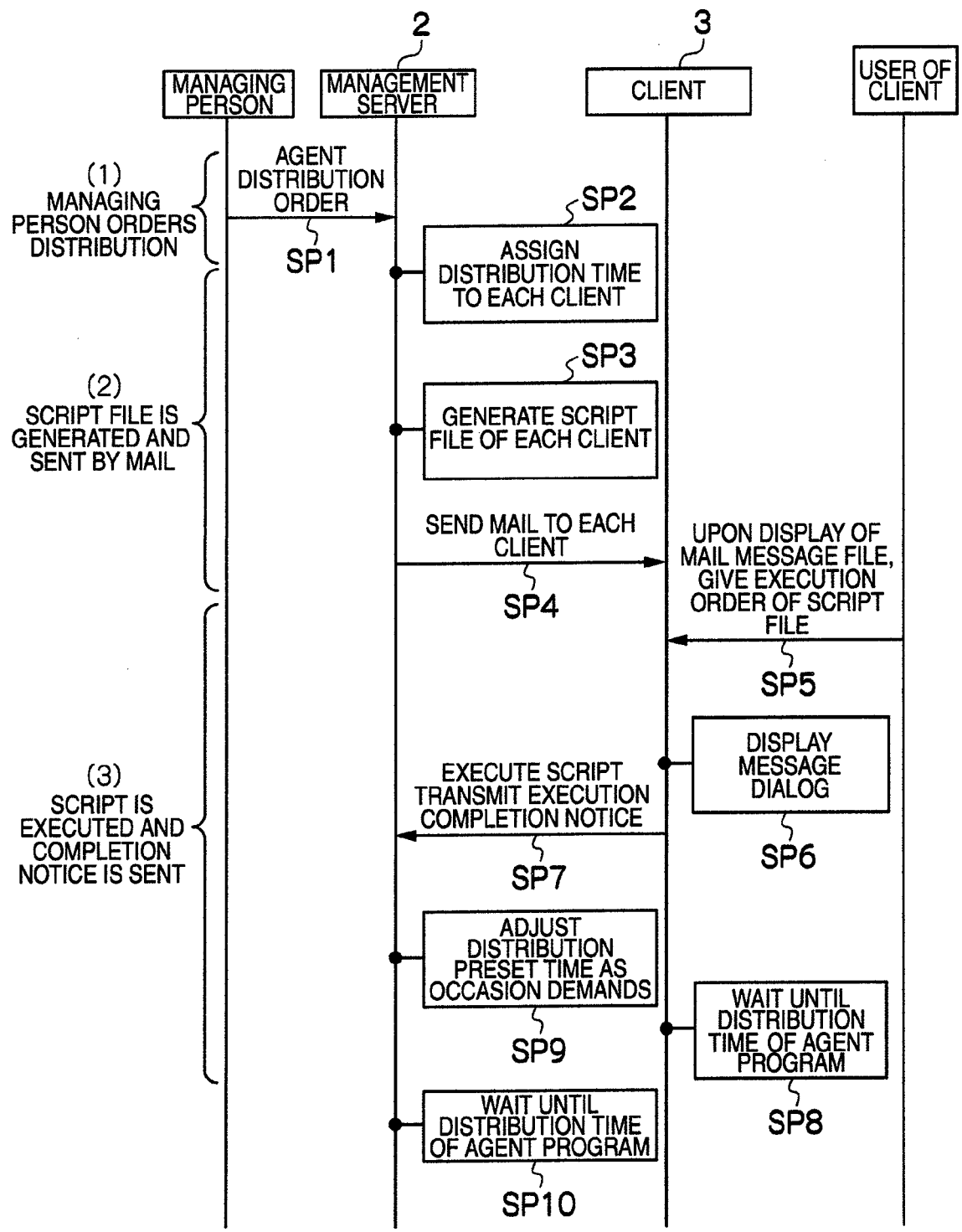
FIG. 8 is a ladder chart for explaining a flow of pre-processing in a software distribution scheme according to a first embodiment.

FIG. 8 shows a concrete processing flow of pre-processing in the above described software distribution scheme. When distributing an agent program to the client 3, the managing person inputs a distribution order (hereafter referred to as agent program distribution order) to the management server 2 to specify an agent program to be distributed, a distribution destination of the agent program (a client 3 of distribution destination) and its distribution start date and hour (SP1).

When the agent program distribution order is input, the management server 2 assigns distribution time when the agent program is to be distributed to each of clients to which the agent program should be distributed, in accordance with distribution start time specified by the managing person. And the management server 2 stores the distribution time assigned to each client 3 in the distribution time column 43F of a corresponding entry in the client management table 43 (FIG. 4) (SP2).

Subsequently, the management server 2 generates the script file 29 (FIG. 1) of each client 3 which describes a node ID and distribution time of the client 3 and a generation rule of an ID and a password of a temporary account, and stores the generated script file 29 in the hard disk device 12. Furthermore, the management server 2 stores a path to each script file 29 stored in the hard disk device 12 at this time in the script storage path column 43H (FIG. 1) of a corresponding entry in the client management table 43 (SP3).

Thereafter, the management server 2 sends the mail message file 30 with the corresponding script file 29 (FIG. 1) attached thereto to each client 3 specified as the distribution destination of the agent program (SP4).

On the other hand, upon receiving the mail message file 30, the user of the client 3 manipulates the client 3 to give an unsealing order of the mail message file 30 and an execution order of the script file 29 attached to the mail message file 30 to the client 3 (SP5).

In response to the unsealing order of the mail message file 30 from the user, the client 3 unseals the mail message file 30. As a result, the mail message described above with reference to FIG. 3 is displayed to the client 3. In response to the execution order of the script file 29 from the user, the client 3 executes the script file 29 (SP6).

Upon finishing execution of the processing according to the script 26 based on the script file 29, the client 3 transmits an execution completion notice (hereafter referred to as script execution completion notice) of the script 26 containing information such as the node ID and IP address of the client 3 and current time in the client 3 to the management server 2 (SP7). Thereafter, the client 3 waits until the distribution time of the agent program (SP8).

Upon receiving the script execution completion notice, the management server 2 stores the IP address of the client 3 contained in the script execution completion notice. If there is a time lag between current time of the management server 2 and current time of the client 3 on the basis of the current time of the client 3 contained in the script execution completion notice, then the management server 2 adjusts the distribution time by the time lag quantity and updates the client management table 43 according to it (SP9). Thereafter, the management server 2 waits until the distribution time of the agent program is reached (SP10).

Figure 9:
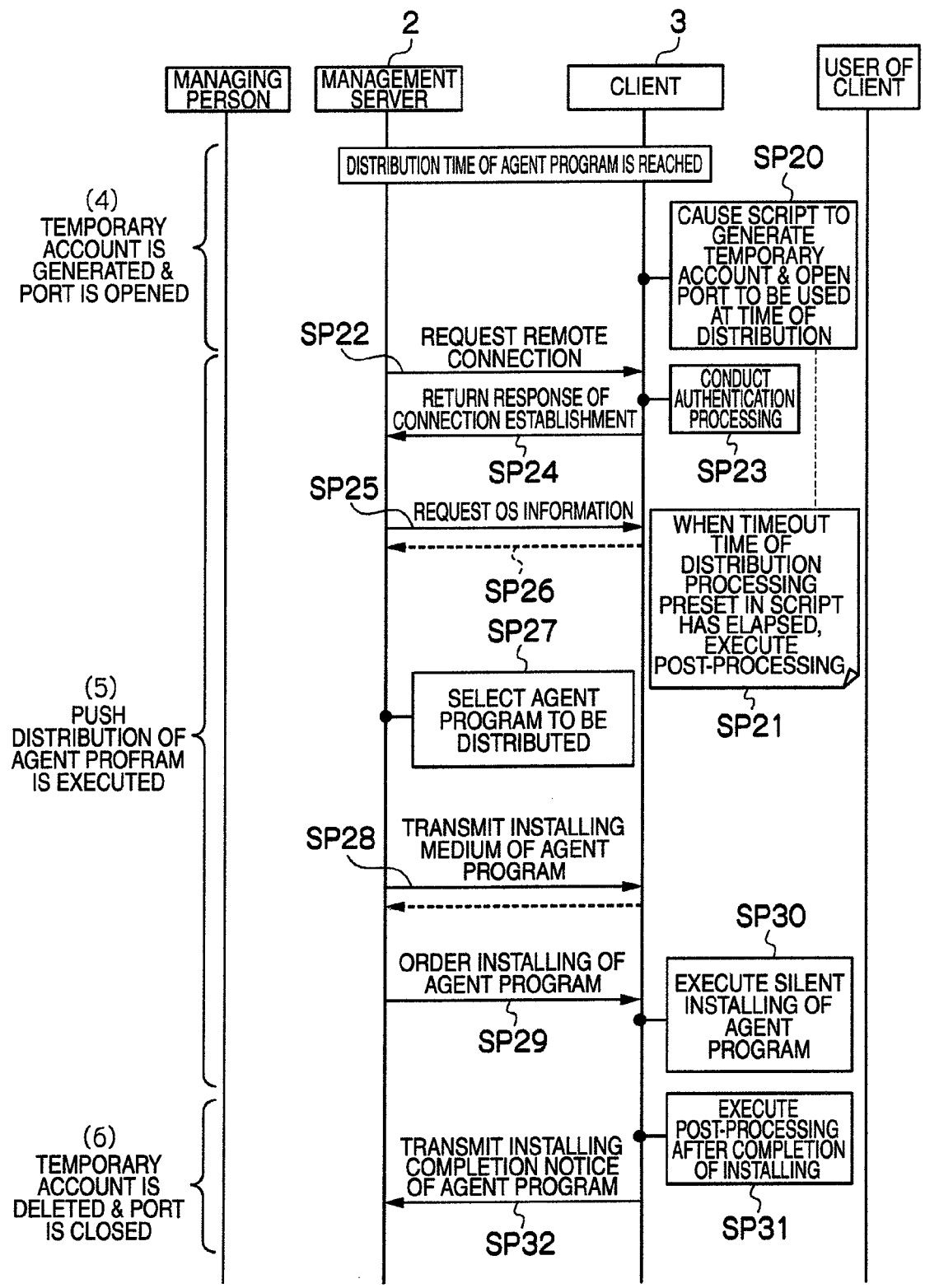
FIG. 9 is a ladder chart for explaining a flow of distribution execution processing in a software distribution scheme according to the first embodiment.

On the other hand, FIG. 9 shows a flow of distribution execution processing conducted to distribute an agent program of distribution subject to the client 3 from the management server 2.

Upon reaching on the client 3 the distribution time of the agent program given as a notice from the management server 2 by the above-described pre-processing, the script 26 (FIG. 1) installed in the pre-processing generates authentication information (an ID and a password) of a temporary account in accordance with a predetermined generation rule prescribed in the script file 29, and opens a port for receiving an agent program transmitted from the management server 2. Thereafter, the client 3 waits a remote connection request given by the management server 2 (SP20).

If a remote connection request cannot be received from the management server 2 before a predetermined timeout time elapses, then the script 26 deletes a temporary account to block up a security hole, closes the opened port, transmits an error notice to the management server 2, and then deletes itself (SP21).

On the other hand, if the distribution time of the agent program is reached, the management server 2 generates authentication information of a temporary account in accordance with the above-described generation routine, and transmits a remote connection request to the client 3 by using the generated authentication information (SP22).

Upon receiving the remote connection request, the script 26 in the client 3 conducts authentication processing (SP23). Upon confirming that the management server 2 is a device permitted to access its own client 3, the script 26 notifies the management server 2 that remote connection between the management server 2 and its own client 3 has been established (SP24). Hereafter, this notice is referred to as remote connection establishment notice.

Upon receiving the remote connection establishment notice, the management server 2 accesses the client 3 and requests the client 3 to transmit OS information of the client 3 (SP25). In response to this request, the script 26 in the client 3 transmits its own OS information to the management server 2 (SP26).

On the basis of the OS information of the client 3 thus acquired, the management server 2 selects an agent program which conforms to the class of the OS 24 in the client 3 (SP27). The management server 2 transmits an installing medium 28 (FIG. 1) of the selected agent program to the client 3 (SP28). Thereafter, the management server 2 orders the client 3 to install the agent program (hereafter this order is referred to as installing order) (SP29).

Upon being given the installing order, the client 3 executes silent installing of the agent program on the basis of the installing program 27 (FIG. 1) included in the installing medium 28 (SP30). Upon completion of the silent installing of the agent program, the client 3 deletes the temporary account, closes the opened port, and deletes the script 26 (SP31).

Thereafter, the client 3 transmits an installing completion notice to the management server 2 on the basis of the agent program installed at the step SP30 (SP32). Thereafter, the client 3 finishes the distribution execution processing of the agent program. Upon receiving the installing completion notice, the management server 2 also finishes the distribution execution processing of the agent program.

Figure 10:
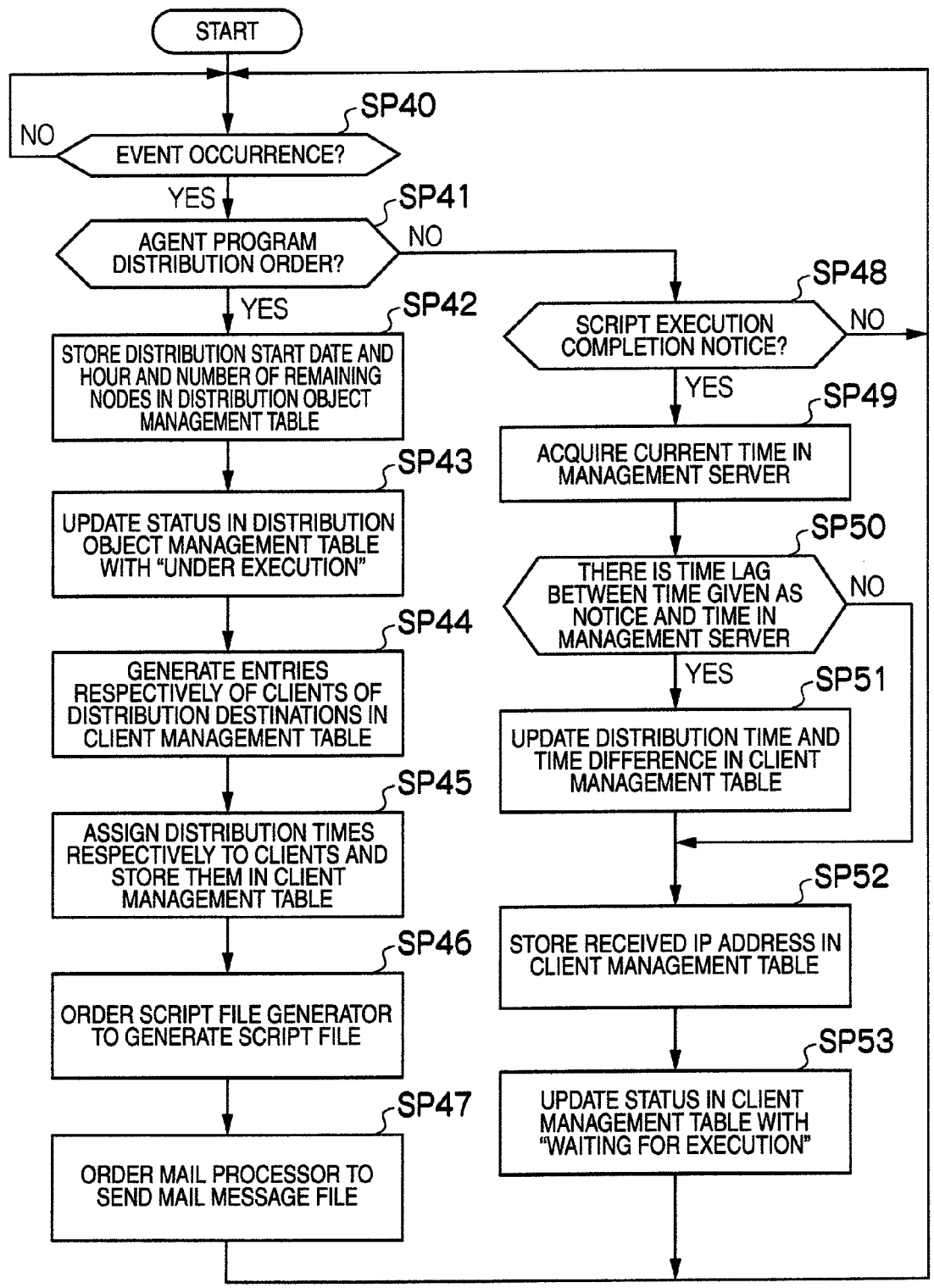
FIG. 10 is a flow chart showing concrete processing contents of a manager controller in a management server concerning the pre-processing.

(1-2-4) Processing of Manager Program (1-2-4-1) Processing of Manager Controller FIG. 10 shows concrete processing contents of the manager controller 31 in the manager program 14 concerning pre-processing in the software distribution scheme according to the present embodiment.

In this case, the manager controller 31 first waits for occurrence of a predetermined event (SP40). Here, the "event" means that the above-described agent program distribution order is given by the managing person at the step SP1 in FIG. 8 or the above-described script execution completion notice is given by the client 3 at the step SP7 in FIG. 8.

If an affirmative result is soon obtained at the step SP40, then the manager controller 31 makes a decision whether a signal received at that time is the agent program distribution order (SP41).

If an affirmative result is obtained in this decision, then on the basis of the agent distribution order given by the managing person at this time, the manager controller 31 stores the distribution start date and hour specified in the agent program distribution order, into the distribution start date and hour column 44C (FIG. 5) of an entry corresponding to the agent program of the distribution subject in the distribution object management table 44 (FIG. 5). In addition, the manager controller 31 stores the number of clients 3 specified as distribution destinations in the number of remaining nodes column 44D (FIG. 5) of that entry (SP42).

Subsequently, the manager controller 31 updates the status stored in the status column 44E (FIG. 5) of that entry in the distribution object management table 44 with "under execution" (SP43). Thereafter, entries respectively of the clients 3 specified as the distribution destinations are generated in the client management table 43 (FIG. 4) (SP44). Specifically, the manager controller 31 secures entries respectively of clients 3 specified as distribution destinations in the client management table 43, and stores the distribution object IDs of the agent programs of the distribution subject into the assigned distribution object ID column 43E (FIG. 4) of the entries. The manager controller 31 inputs initial values to the distribution time column 43F, the time difference column 43G, the script storage path column 43H, the script file execution path column 43I, the status column 43J and the result code column 43K.

Subsequently, the manager controller 31 assigns distribution times to the clients 3 specified as distribution destinations in accordance with the distribution start time of the agent program specified by the managing person. For example, if the distribution start time specified by the managing person is "2008/05/19 12:00:00" and required distribution time of the agent program of distribution subject per client is three minutes, then the manager controller assigns distribution time such as "2008/05/19 12:00:00" to the first client 3 and "2008/05/19 12:03:00" to the second client 3 as shown in FIG. 11. Although the required distribution time of the agent program of distribution subject per client has been supposed to be three minutes, the required distribution time is calculated on the basis of the network band and the volume of the agent program of distribution subject. Thereafter, the manager controller 31 stores the distribution times respectively assigned to the clients 3 specified as distribution destinations into the distribution time column 43F of the corresponding entries in the client management table 43 (SP45).

Subsequently, the manager controller 31 delivers a list of node IDs of the clients 3 specified as distribution destinations to the script file generator 32 (FIG. 1) and orders the script file generator 32 to generate a script file 29 for each of the clients 3 (hereafter the order is referred to as script file generation order) (SP46).

In addition, the manager controller 31 delivers a list of node IDs of the clients 3 specified as distribution destinations to the mail processor 33 and orders the mail processor 33 to send the message file 30 (FIG. 1) with the script file 29 generated by the script file generator 32 attached thereto to each of the clients 3 (hereafter this order is referred to as mail message file sending order) (SP47). Thereafter, the manager controller 31 returns to the step SP40.

On the other hand, if a negative result is obtained in the decision at the step SP41, the manager controller 31 makes a decision whether a signal received at that time is a script execution completion notice (SP48). If a negative result is obtained in this decision, the manager controller 31 returns to the step S40.

On the other hand, if an affirmative result is obtained in the decision, the manager controller 31 acquires current time in the management server 2 from an internal clock which is included in the management server 2 and which is not illustrated (SP49).

Subsequently, the manager controller 31 compares the current time in the client 3 which has transmitted the script execution completion notice contained in the script execution completion notice with the current time in the management server 2 acquired at the step SP49, and makes a decision whether there is a time lag between these two current times (SP50).

If a negative result is obtained in this decision, the manager controller 31 proceeds to step SP52. On the other hand, if an affirmative result is obtained in the decision, then the manager controller 31 calculates a difference between the current time and the current time in the management server 2, and stores a result of the calculation in the time difference column 43G of an entry corresponding to the client in the client management table 43 (FIG. 4). Furthermore, the manager controller 31 updates the distribution time stored in the distribution time column 43F of that entry in the client management table 43 on the basis of the calculation result (SP51).

For example, it is supposed that the distribution time of the agent program to the client 3 is "2008/05/19/13:00:00". If at this time the current time in the client 3 is "2008/05/19/12:13:45" and the current time in the management server 2 is "2008/05/19/12:14:55", then the current rime in the management server 2 is one minute and ten seconds fast as compared with the current time in the client 3. In this case, the manager controller 31 updates the distribution time of the agent program to the client 3 stored in the distribution time column 43F in the client management table 43 with "2008/05/19/13:01:10", and updates the time difference between the client 3 and the management server 2 stored in the time difference column 43G with "70".

Subsequently, the manager controller 31 stores an IP address of the client 3 contained in the script execution completion notice into the IP address column 43B of a corresponding entry in the client management table 43 (SP52). In addition, the manager controller 31 updates the status stored in the status column 43J of the entry with "waiting for execution" (SP53), and then returns to the step SP40.

Figure 12:
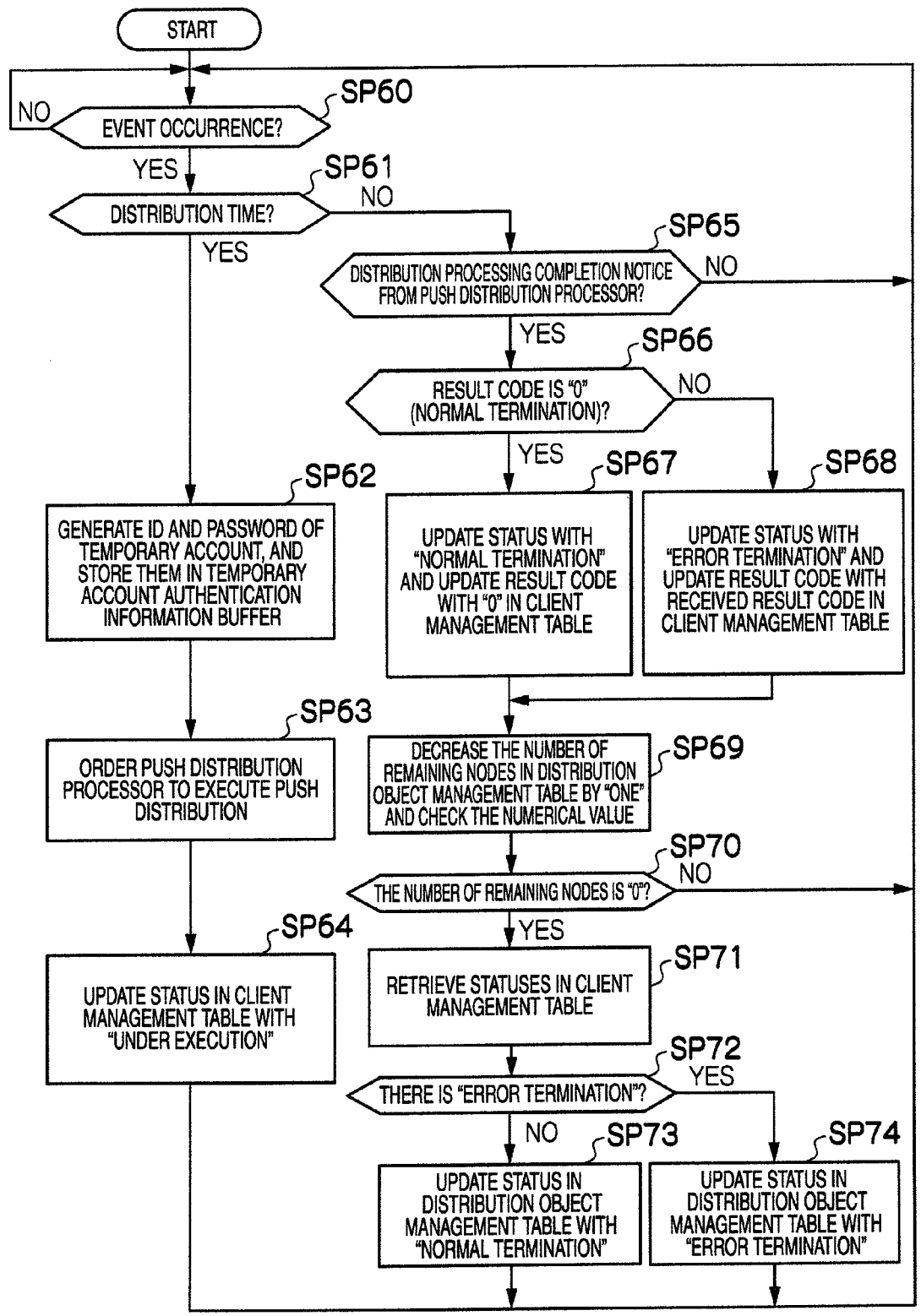
FIG. 12 is a flow chart showing concrete processing contents of the manager controller in the management server concerning the distribution execution processing.

FIG. 12 shows concrete processing contents of the manager controller 31 concerning the distribution execution processing in the software distribution scheme according to the present embodiment.

Upon finishing the pre-processing described above with reference to FIG. 10, the manager controller 31 starts the distribution execution processing and first waits for occurrence of a predetermined event (SP60). Here, the "event" means that distribution time of an agent program to some client 3 specified as the distribution destination is reached or a distribution processing completion notice of an agent program described later is given by the push distribution processor 34 at step SP106 or step SP115 in FIG. 15.

If an affirmative result is soon obtained at the step SP40, then the manager controller 31 makes a decision whether the event at that time is that distribution time of the agent program to some client 3 specified as the distribution destination is reached (SP61).

If an affirmative result is obtained in this decision, then the manager controller 31 generates an ID and a password of a temporary account by using the IP address and distribution time respectively stored in the IP address column 43B and the distribution time column 43F (FIG. 4) of an entry corresponding to the client 3 in the client management table 43 in accordance with a predetermined generation rule prescribed in the script file 29 (FIG. 1), and stores generated temporary account authentication information in the temporary account authentication information buffer 46 in the hard disk device 12 (SP62).

Subsequently, the manager controller 31 orders the push distribution processor 34 to execute push distribution of an agent program of distribution subject (SP63), updates the status stored in the status column 43J of the corresponding entry in the client management table 43 with "under execution" (SP64), and returns to the step SP60.

On the other hand, if a negative result is obtained in the decision at the step SP61, the manager controller 31 makes a decision whether the event which has occurred at the step SP60 is reception of a distribution processing completion notice from the push distribution processor 34 (SP65). If a negative result is obtained in this decision, the manager controller 31 returns to the step SP60.

On the other hand, if an affirmative result is obtained in the decision at the step SP65, then the manager controller 31 makes a decision whether a result code contained in the distribution processing completion notice received at that time is "0" which means normal termination (SP66).

If an affirmative result is obtained in this decision, then the manager controller 31 updates the status stored in the status column 43J (FIG. 4) of the corresponding entry in the client management table 43 with "normal termination," and updates the result code stored in the result code column 43K (FIG. 4) of that entry with "0" (SP67).

If a negative result is obtained in the decision at the step SP68, then the manager controller 31 updates the status stored in the status column 43J of the corresponding entry in the client management table 43 with "error termination," and updates the result code stored in the result code column 43K (FIG. 4) of that entry with the result code ("1" or "2") contained in the distribution processing completion notice received at that time (SP68).

Subsequently, the manager controller 31 decreases the number of remaining nodes stored in the number of remaining nodes column 44D (FIG. 5) of the corresponding entry in the distribution object management table 44 (FIG. 5) by "one" and then checks the number of remaining nodes (SP69). And the manager controller 31 makes a decision whether the number of remaining nodes has become "0" (SP70).

If a negative result is obtained in this decision, then the manager controller 31 returns to the step SP60 and then similar processing is repeated until distribution of the agent program to be distributed at that time to all clients 3 specified as the distribution destinations is finished.

If the distribution of the agent program to be distributed at that time to all clients 3 specified as the distribution destinations is finished and consequently an affirmative result is obtained in the decision at the step SP70, then the manager controller 31 retrieves statuses respectively stored in the status column 43J (FIG. 4) of entries in the client management table 43 (FIG. 4) respectively corresponding to clients 3 to which the agent program is distributed at that time (SP71), and makes a decision whether the status of "error termination" is already stored in the status column 43J of any entry (SP72).

If a negative result is obtained in this decision, then the manager controller 31 updates the status stored in the status column 44E of an entry corresponding to the agent program distributed at that time among entries in the distribution object management table 44 with "normal termination" (SP73) and then returns to the step SP60.

On the other hand, if an affirmative result is obtained in the decision, then the manager controller 31 updates the status stored in the status column 44E of an entry corresponding to the agent program distributed at that time among entries in the distribution object management table 44 with "error termination" (SP74) and then returns to the step SP60.

(1-2-4-2) Processing in Script File Generator

Figure 13:
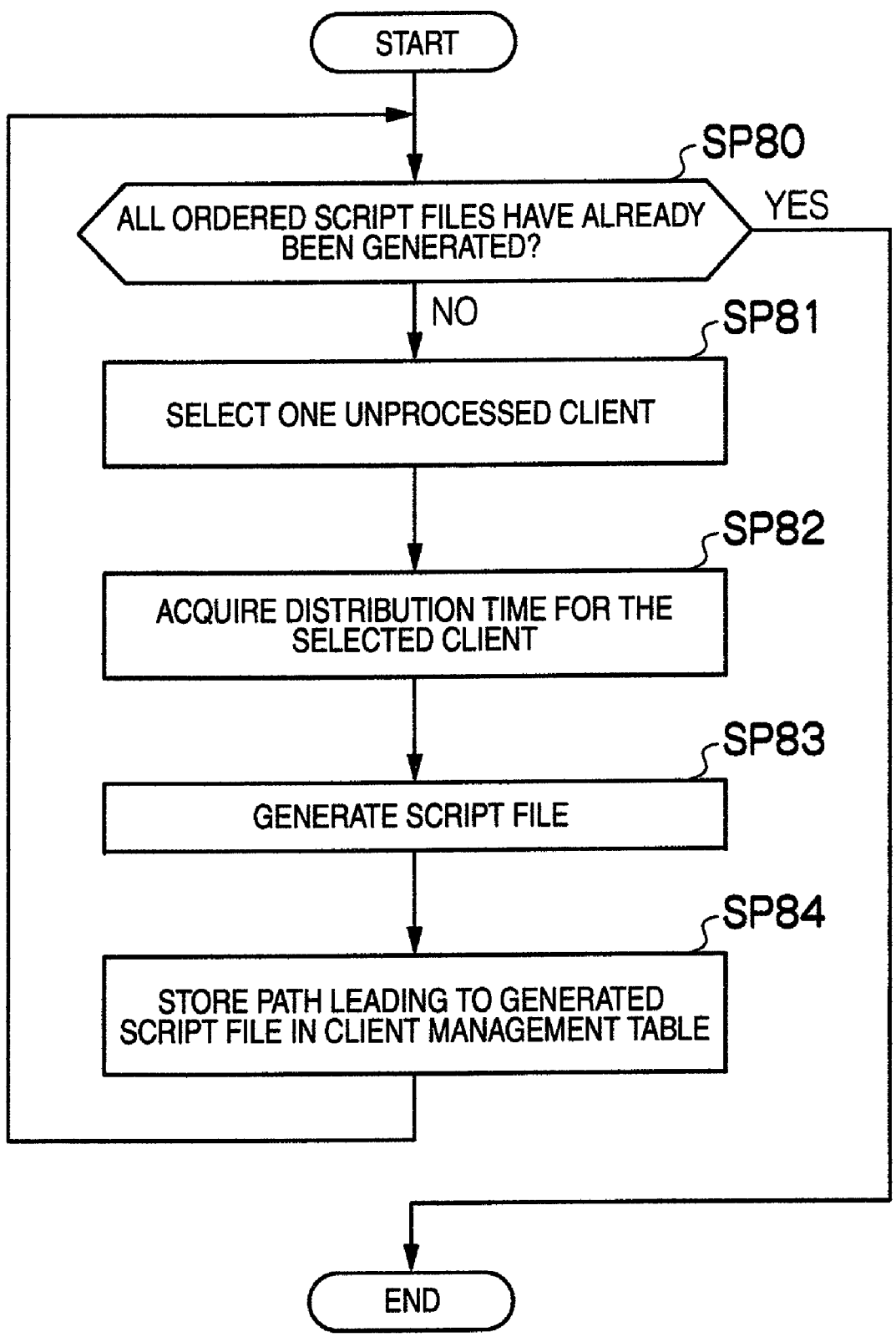
FIG. 13 is a diagram showing concrete processing contents of a script file generator in the management server concerning the pre-processing.

On the other hand, FIG. 13 shows processing contents of script file generation processing executed by the script file generator 32 (FIG. 1) supplied with the script file generation order from the manager controller 31 at the step SP46 in the pre-processing shown in FIG. 10.

Upon receiving the script file generation order from the manager controller 31 in this case, the script file generator 32 starts the script file generation processing. First, the script file generator 32 refers to a list of clients 3 specified as distribution destinations of the agent program, which is given together with the script file generation order by the manager controller 31, and makes a decision whether script files 29 (FIG. 1) for all of those clients 3 have already been generated (SP80).

If a negative result is obtained in this decision, then the script file generator 32 selects one from among clients 3 which are specified as the distribution destinations by the managing person and for which corresponding script files 29 are not yet generated (SP81). The script file generator 32 retrieves and acquires distribution time for the selected client 3 from the client management table 43 (FIG. 4) (SP82).

Subsequently, the script file generator 32 enters necessary items, such as a node ID, distribution time and a contents name of contents to be distributed (agent program), for that client 3 in necessary places in the script file template 40 (FIG. 1) stored in the hard disk device 12 and described earlier with reference to FIGS. 2A and 2B, thus generates the script file 29 for that client 3, and stores the generated script file 29 in the hard disk device 12 (SP83).

Subsequently, the script file generator 32 stores a path leading to the script file 29 thus stored in the hard disk device 12 into the script storage path column 43H (FIG. 4) of the corresponding entry in the client management table 43 (FIG. 4) (SP84).

Subsequently, the script file generator 32 returns to the step SP80, and then repeats similar processing while successively changing over the client 3 selected at the step SP81 to another client 3 (SP80 to SP84-SP80).

Soon, the script file generator 32 finishes generating script files 29 for all of clients specified as the distribution destinations by the managing person. The script file generator 32 thus terminates the script file generation processing.

(1-2-4-3) Processing in Mail Processor

Figure 14:
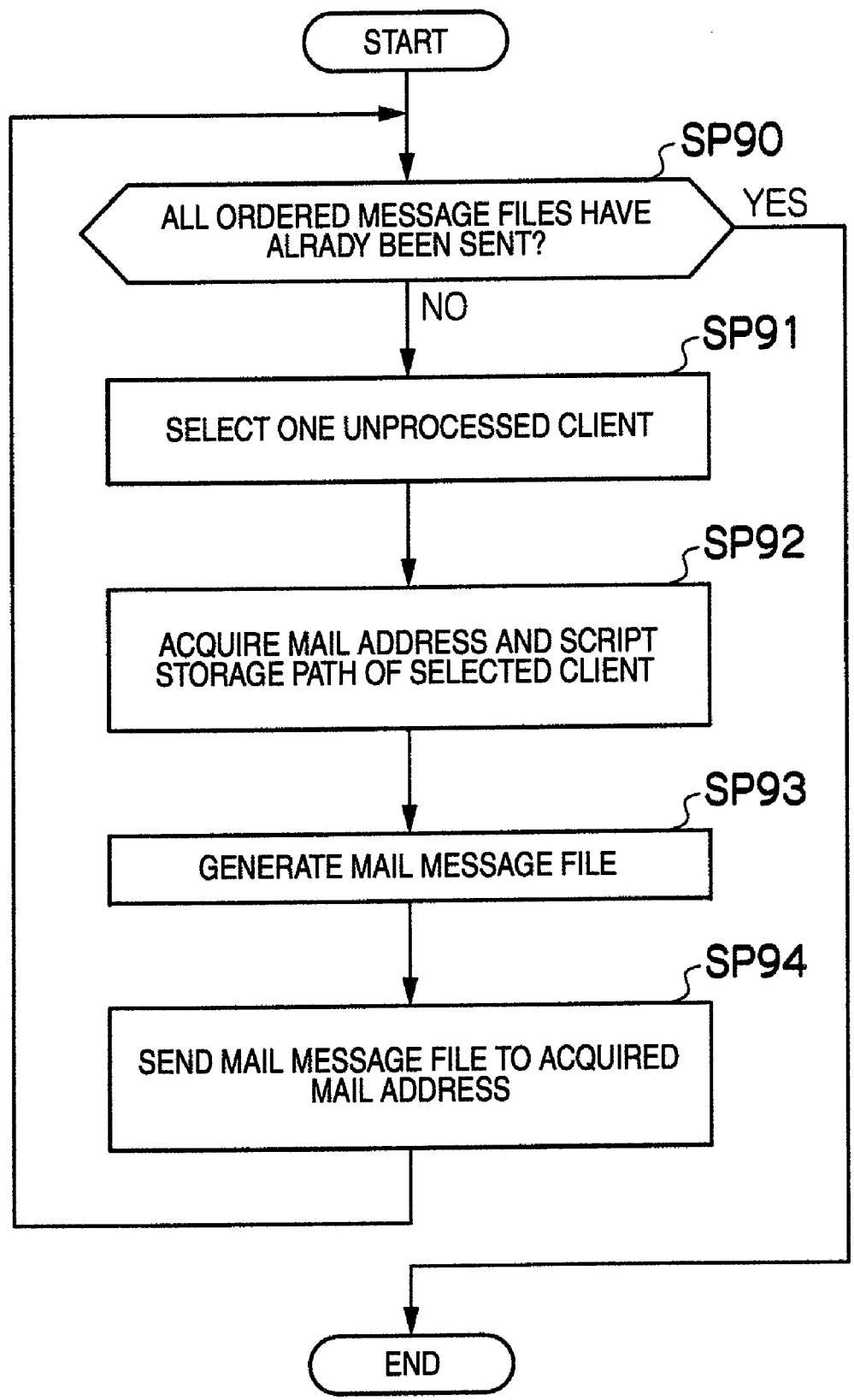
FIG. 14 is a flow chart showing concrete processing contents of a mail processor in the management server concerning the pre-processing.

FIG. 14 shows processing contents of mail message file sending processing executed by the mail processor 33 (FIG. 1) which has received the mail message file sending order given by the manager controller 31 at the step SP47 in the pre-processing shown in FIG. 10.

Upon receiving the mail message file sending order in this case, the mail processor 33 starts the mail message file sending processing. First, the mail processor 33 refers to a list of clients 3 specified as distribution destinations of the agent program, which is given together with the mail message file sending order by the manager controller 31, and makes a decision whether mail message file 30 (FIG. 1) has already been sent to all of those clients 3 (SP90).

If a negative result is obtained in this decision, then the mail processor 33 selects one from among clients 3 which are specified as the distribution destinations and to which corresponding mail message files 29 are not yet sent (SP91). The mail processor 33 acquires a mail address of the selected client 3 and a path leading to the corresponding script file 29 (FIG. 1) from the client management table 43 (FIG. 4) (SP92).

Subsequently, the mail processor 33 enters a contents name of contents to be distributed (agent program) and distribution start time in necessary places in the mail message file template 41 (FIG. 1) stored in the hard disk device 12 and described earlier with reference to FIG. 3, and thus generates the mail message file 30 for the corresponding client 3.

The mail processor 33 attaches the script file 29 to the generated mail message file 30 (SP93), and sends the resultant mail message file 30 to the mail address acquired at the step SP92 (the client 3 selected at the step SP91) (SP94).

Subsequently, the mail processor 33 returns to the step SP90, and then repeats similar processing while successively changing over the client 3 selected at the step SP91 to another client 3 (SP90 to SP94-SP90).

Soon, the mail processor 33 finishes sending the mail message files 30 to all of clients specified as the distribution destinations by the managing person. The mail processor 33 thus terminates the mail message file sending processing.

(1-2-4-4) Processing in Push Distribution Processor

Figure 15:
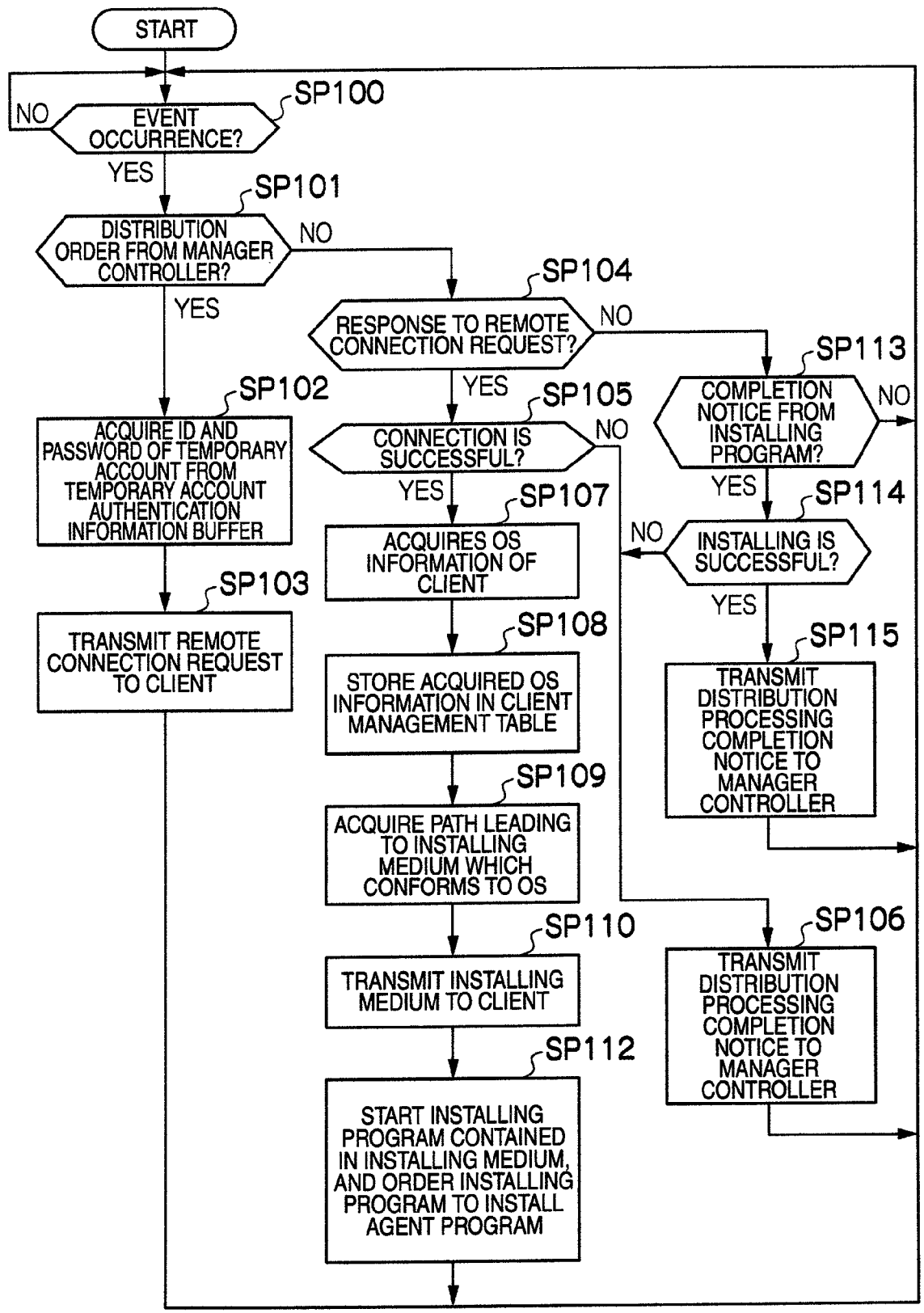
FIG. 15 is a flow chart showing concrete processing contents of a push distribution processor in the management server concerning the distribution execution processing.

FIG. 15 shows contents of processing conducted by the push distribution processor 34 (FIG. 1) as regards the distribution execution processing described earlier with reference to FIG. 9.

In this case, the push distribution processor 34 waits for occurrence of a predetermined event (SP100). Here, the "event" means that the push distribution execution order is given by the manager controller 31 at the step SP63 in the distribution execution processing described earlier with reference to FIG. 12, the response to the above-described remote connection request described earlier with reference to the step SP24 in FIG. 9 is given by the client 3, or the installing completion notice described earlier with reference to the step SP32 in FIG. 9 is given by the installing program.

If an affirmative result is obtained at step SP100 as a result of occurrence of an event which takes place soon, then the push distribution processor 34 makes a decision whether the event which has occurred at that time is that the push distribution order has been given by the manager controller 31 (SP101).

If an affirmative result is obtained in this decision, then the push distribution processor 34 reads out the temporary account authentication information (ID and password) generated and stored by the manager controller 31 from the temporary account authentication information buffer 46 (FIG. 1) (SP102). Furthermore, the push distribution processor 34 transmits a remote connection request to the corresponding client 3 via the remote management interface 35 (FIG. 1) in the OS 15 (FIG. 1) by using the temporary account authentication information read out (SP103), and then returns to the step SP100.

On the other hand, if a negative result is obtained in the decision at the step SP101, the push distribution processor 34 makes a decision whether the event which has occurred at the step SP100 is that the response to the remote connection request has been given by the client 3 (SP104).

If an affirmative result is obtained in this decision, the push distribution processor 34 makes a decision whether remote connection to the client 3 is successful on the basis of the response of the client 3 to the remote connection request (SP105).

If a negative result is obtained in this decision, the push distribution processor 34 transmits a distribution processing completion notice with a result code of "1" (a result code meaning that authentication processing has failed at the time of remote connection) stored therein to the manager controller 31 (SP106). Thereafter, the push distribution processor 34 returns to the step SP100.

On the other hand, if an affirmative result is obtained in the decision at the step SP104, then the push distribution processor 34 acquires OS information which represents classification information of the OS 24 (FIG. 1) mounted on the client 3 from the client 3 subjected to the remote connection at that time (SP107), and stores the acquired OS information in the OS column 43D of the corresponding entry in the client management table 43 (FIG. 4) (SP108).

Subsequently, the push distribution processor 34 acquires a path leading to the installing medium 28 (FIG. 1) which conforms to the OS in the client 3, from the installing medium management table 45 (FIG. 6) (SP109). And the push distribution processor 34 reads out the corresponding installing medium 28 from the hard disk device 12 via the path for the installing medium 28 acquired at this time, and transmits the installing medium 28 thus read out to the client 3 (SP110).

In addition, the push distribution processor 34 exercises remote control on the client 3, starts the installing program 27 (FIG. 1) contained in the installing medium 28, and orders the installing program 27 to install an agent program contained in the installing medium 28 (SP112). Thereafter, the push distribution processor 34 returns to the step SP100.

On the other hand, if a negative result is obtained in the decision at the step SP104, the push distribution processor 34 makes a decision whether the event which has occurred at the step SP100 is that the installing completion notice from the installing program 27 has been given (SP113).

If a negative result is obtained in this decision, the push distribution processor 34 returns to step SP100. On the other hand, if an affirmative result is obtained, the push distribution processor 34 makes a decision whether installing of the agent program of distribution subject to the client 3 is successful on the basis of the installing completion notice (SP114).

If an affirmative result is obtained in this decision, the push distribution processor 34 transmits a distribution processing completion notice with a result code of "2" (a result code meaning that authentication processing has failed at the time of remote connection) stored therein to the manager controller 31 (SP115). Thereafter, the push distribution processor 34 returns to the step SP100.

On the other hand, if an affirmative result is obtained in the decision at the step SP114, the push distribution processor 34 transmits a distribution processing completion notice with a result code of "2" (a result code meaning that authentication processing has failed at the time of remote connection) stored therein to the manager controller 31 (SP106). Thereafter, the push distribution processor 34 returns to the step SP100.

(1-2-5) Processing in Client (1-2-5-1) Processing of Mail Program

Figure 16:
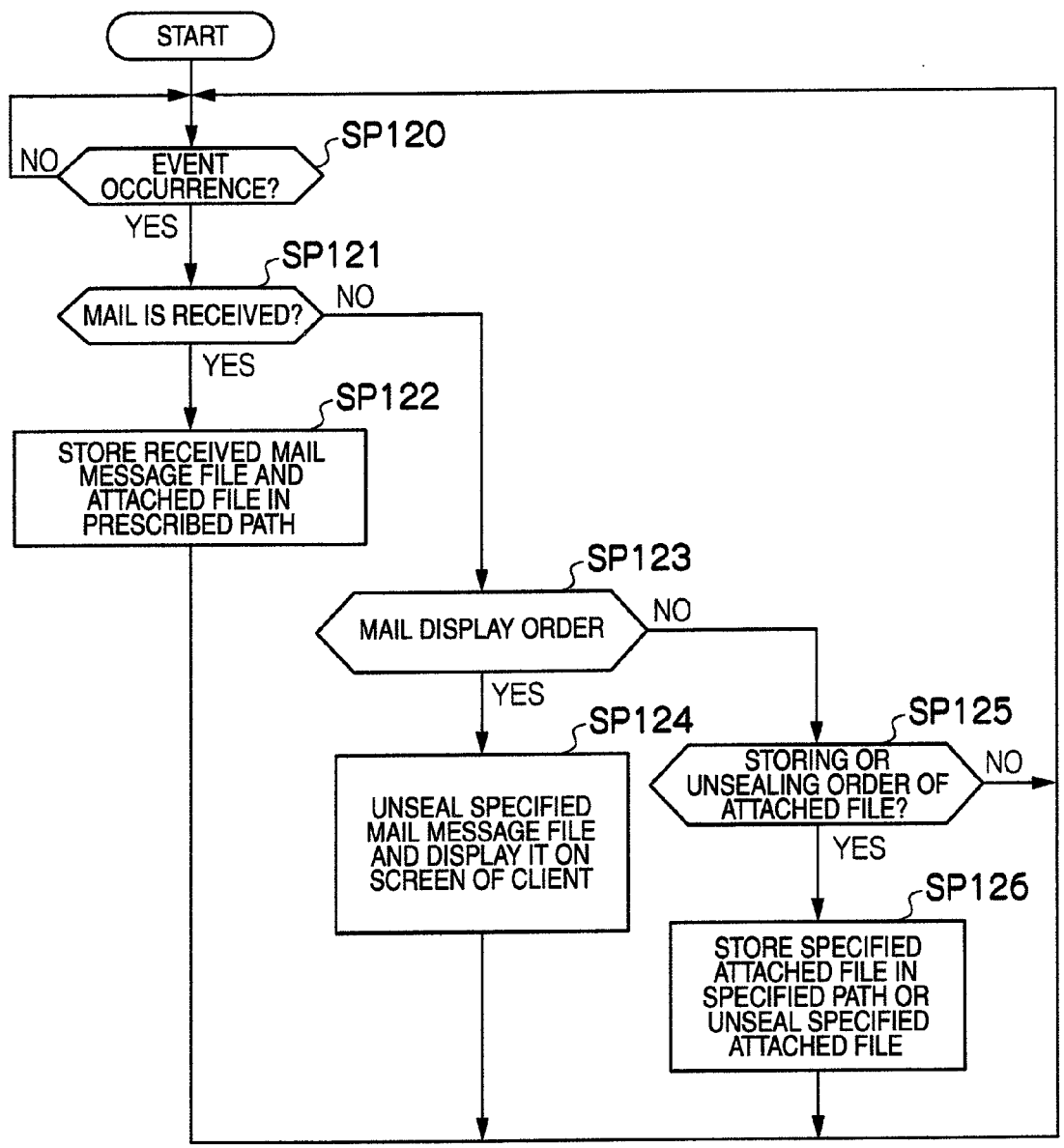
FIG. 16 is a flow chart showing concrete processing contents of a mail program in a client concerning the pre-processing.

FIG. 16 shows concrete processing contents of the mail program 25 (FIG. 1) mounted on the client 3 concerning the software distribution scheme according to the present embodiment.

Usually, the mail program waits for occurrence of a predetermined event. Here, the "event" means that the mail message file 30 (FIG. 1) transmitted from the management server 2 at the step SP94 in FIG. 14 is received or the storing or unsealing order of the mail message file 30 (FIG. 1) is given by the user at the step SP5 in FIG. 8.

If an affirmative result is obtained at step SP120 as a result of occurrence of an event which takes place soon, then the mail program 25 makes a decision whether the event which has occurred at that time is that the mail message file 30 is received from the management server 2 (SP121).

If an affirmative result is obtained in this decision, then the mail program 25 stores the received mail message file 30 and the script file 29 attached to the mail message file 30 into a storage area specified by a prescribed path in the hard disk device 22 in the client 3 (SP122), and then returns to the step SP120.

On the other hand, if a negative result is obtained in the decision at the step SP121, then the mail program 25 makes a decision whether the event which has occurred at that time is that a mail display order is given by the user (SP123).

If an affirmative result is obtained in this decision, then the mail program 25 unseals the mail message file 30 stored in the storage area specified by the prescribed path in the hard disk device 12 at the step SP122, and causes the message based on the mail message file 30 and described earlier with reference to FIG. 3 to be displayed on the display in the client 3 (SP124). Thereafter, the mail program 25 returns to the step SP120.

On the other hand, if a negative result is obtained in the decision at the step SP123, then the mail program 25 makes a decision whether the event which has occurred at that time is that the storing or unsealing order of the script file attached to the mail message file 30 is given by the user (SP125).

If a negative result is obtained in this decision, the mail program 25 returns to the step SP120. On the other hand, if an affirmative result is obtained in the decision at the step SP125, then the mail program 25 stores the script file 29 into a storage area specified by the specified path in the hard disk device 22, or unseals the script file 29 (SP126), and then returns to the step SP120.

(1-2-5-2) Processing of Script

Figure 17:
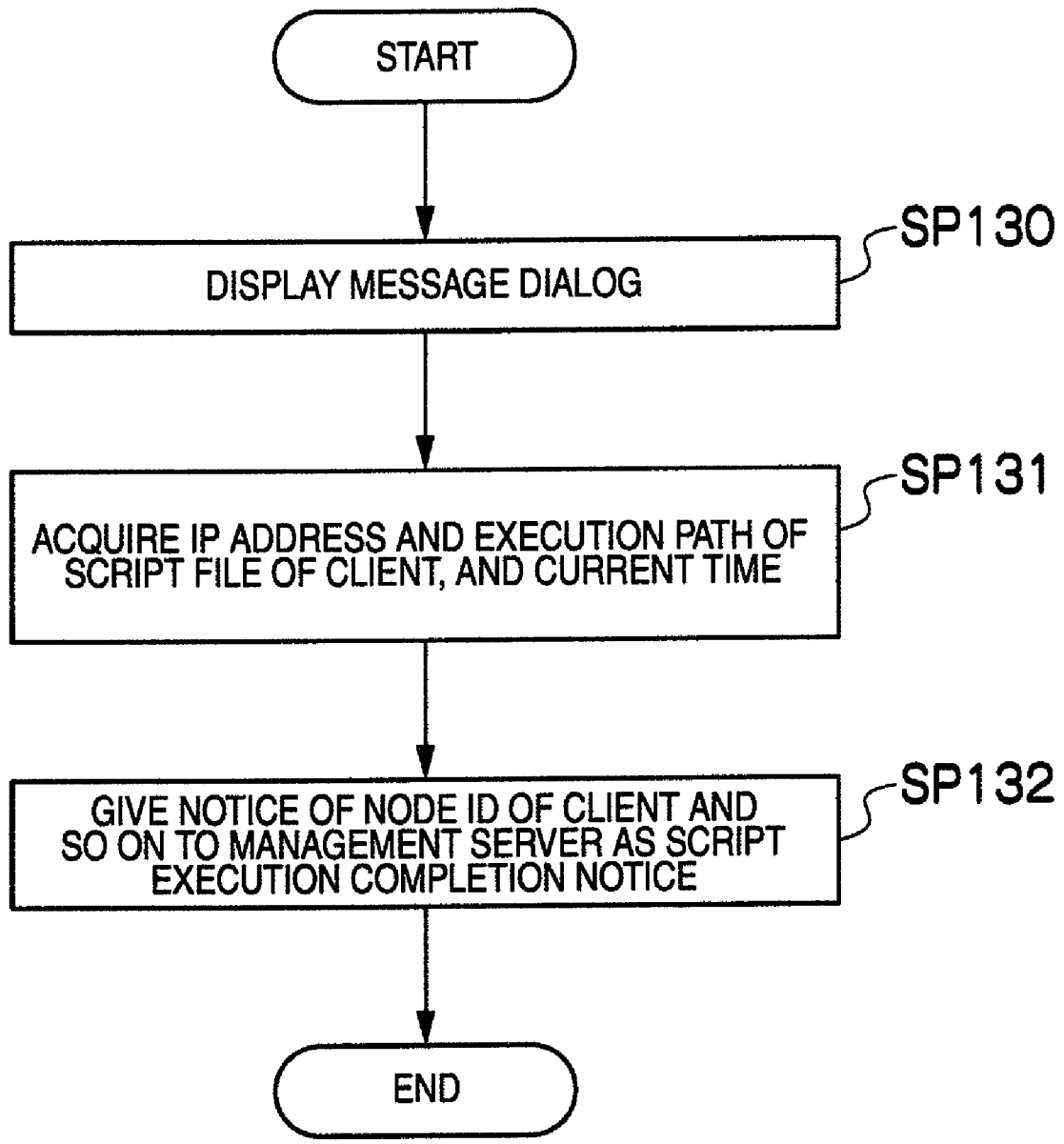
FIG. 17 is a flow chart showing concrete processing contents of a script concerning the pre-processing.

On the other hand, FIG. 17 shows concrete processing contents of the script 26 (FIG. 1) installed in the client 3 concerning the pre-processing in the software distribution scheme according to the present embodiment.

If the user of the client 3 executes the script file 29, then the script 26 based on the script file 29 causes a message dialog which has a message for prompting the user to have already started the client 3 at prescribed distribution time and which is not illustrated to be displayed on the display in the client 3 (SP130).

Subsequently, the script 26 acquires an IP address of the client 3, an execution path of the script file 29, and current time in the client 3 (SP131). Thereafter, the script 26 gives a notice of the node ID of the client 3, and the IP address of the client, the execution path of the script file 29 and the current time in the client 3 acquired at the step SP131 to the manager controller 31 in the management server 31 as a script execution completion notice (SP132). Then, the script 26 finishes the series of processing.

Figure 18:
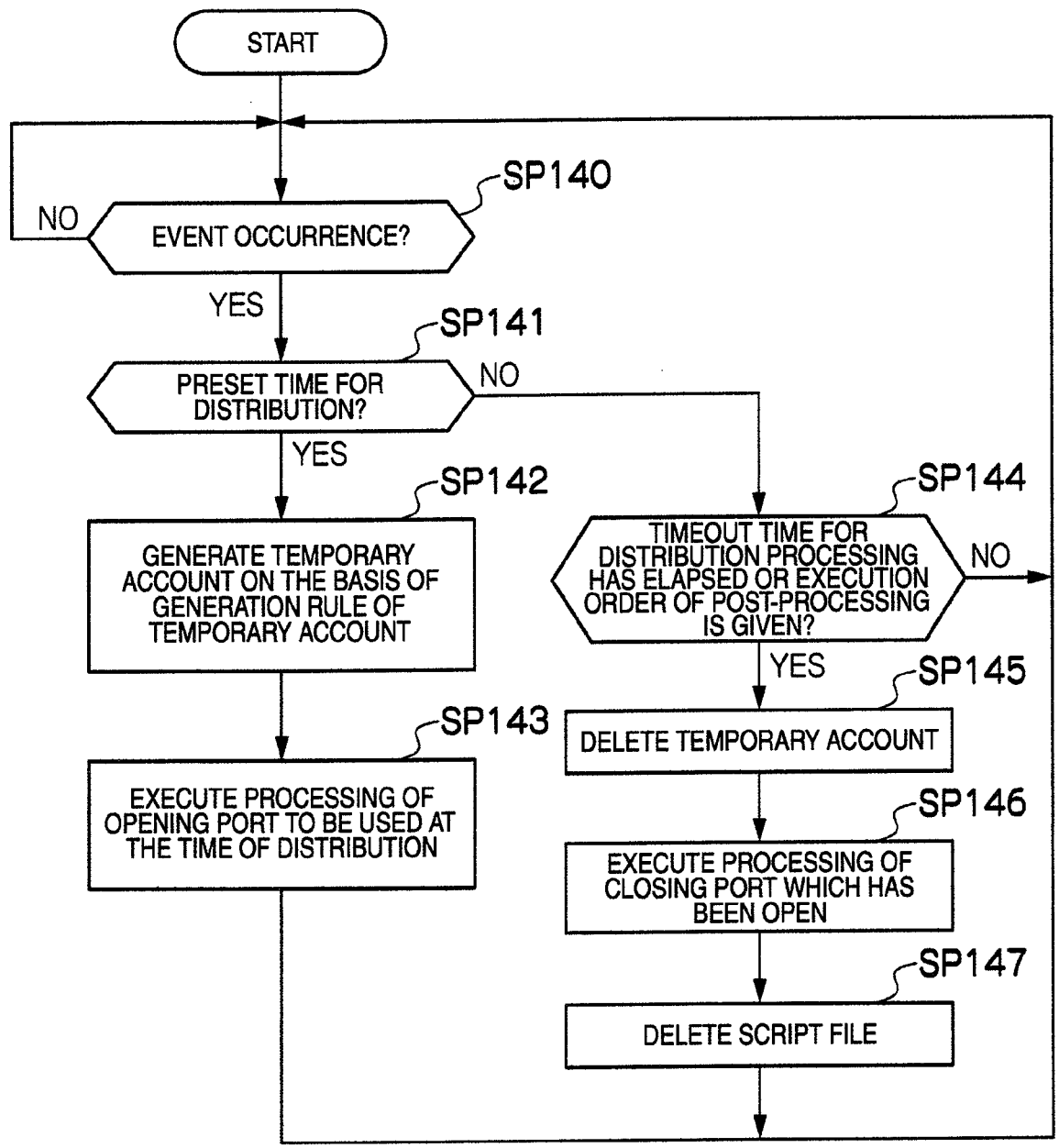
FIG. 18 is a flow chart showing concrete processing contents of a script concerning the distribution execution processing.

On the other hand, FIG. 18 shows concrete processing contents of the script 26 concerning the distribution execution processing in the software distribution scheme according to the present embodiment.

In this case, the script 26 waits for occurrence of a predetermined event. Here, the "event" means that the current time reaches the distribution time of the agent program preset for the client 3, the timeout described with reference to the step SP21 in FIG. 9 occurs, or an execution order of post-processing which will be described later is given by the installing program 27 (FIG. 1) (see steps SP152 and SP154 in FIG. 19).

If an affirmative result is obtained at step SP140 as a result of occurrence of an event which takes place soon, then the script 26 makes a decision whether the event which has occurred at that time is that the distribution time of the agent program is reached (SP141).

If an affirmative result is obtained in this decision, then the script 26 generates a temporary account on the basis of a generation rule of a temporary account recognized on the basis of the script file 29 which is received at the step SP121 in FIG. 16 (SP142). Furthermore, the script 26 executes processing of opening of a port to be used when receiving the agent program transmitted from the management server 2 (SP143). Thereafter, the script 26 returns to the step SP140.

On the other hand, if a negative result is obtained in the decision at the step SP141, the script 26 makes a decision whether a predetermine timeout time has elapsed since the port to be used for reception of the agent program is opened or an execution order of post-processing which will be described later is given by the installing program (SP144).

If a negative result is obtained in this decision, the script 26 returns to the step SP140. On the other hand, if an affirmative result is obtained in the decision at the step SP144, then the script 26 deletes the temporary account generated beforehand (SP145). Furthermore, the script 26 executes processing of closing the port which has been open (SP146), and executes processing of deleting itself (SP147). Thereafter, the script 26 returns to the step SP140.

(1-2-5-3) Processing of Installing Program

Figure 19:
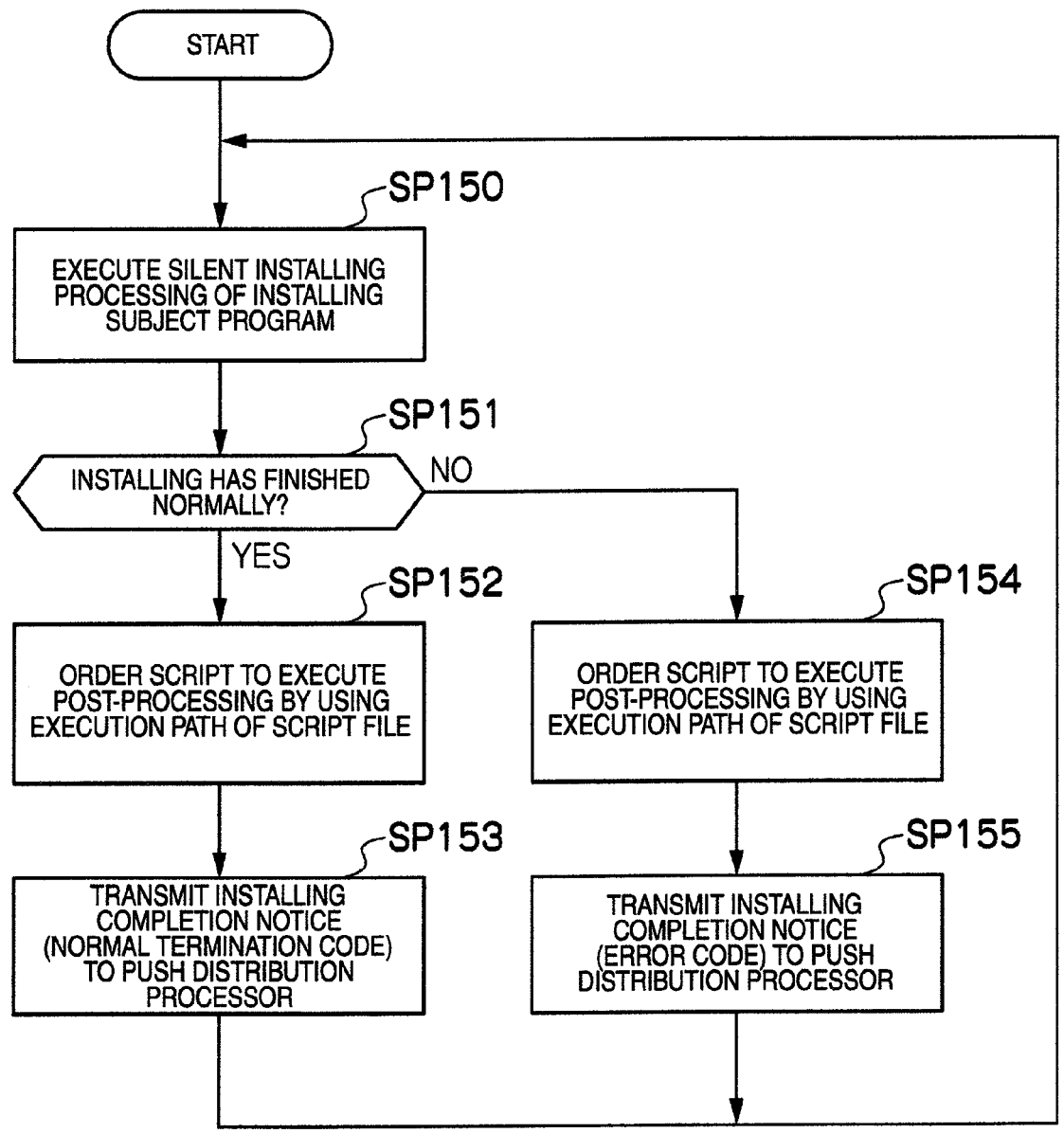
FIG. 19 is a flow chart showing concrete processing contents of an installing program concerning the distribution execution processing.

FIG. 19 shows concrete contents of processing conducted by the installing program 27 (FIG. 1) at the step SP30 in FIG. 9.

Upon being ordered to install an agent program by the push distribution processor 34 (FIG. 1) in the management server 2 (see the step SP29 in FIG. 9), the installing program 27 executes the silent installing processing of the agent program (SP150), and then makes a decision whether the silent installing processing has finished normally (SP151).

If an affirmative result is obtained at the step SP151, then the installing program 27 orders the script 26 to execute post-processing (the steps SP145 to SP147 in FIG. 18) by using the execution path of the script file 29 (SP152), and transmits an installing completion notice containing a normal termination code to the push distribution processor 34 in the management server (SP153). Thereafter, the installing program 27 returns to the step SP150.

On the other hand, if a negative result is obtained in the decision at the step SP151, then the installing program 27 orders the script 26 to execute post-processing by using the execution path of the script file 29 (SP154), and transmits an installing completion notice containing an error code to the push distribution processor 34 in the management server (SP155). Thereafter, the installing program 27 returns to the step SP150.

(1-2-5-4) Processing in OS

Figure 20:
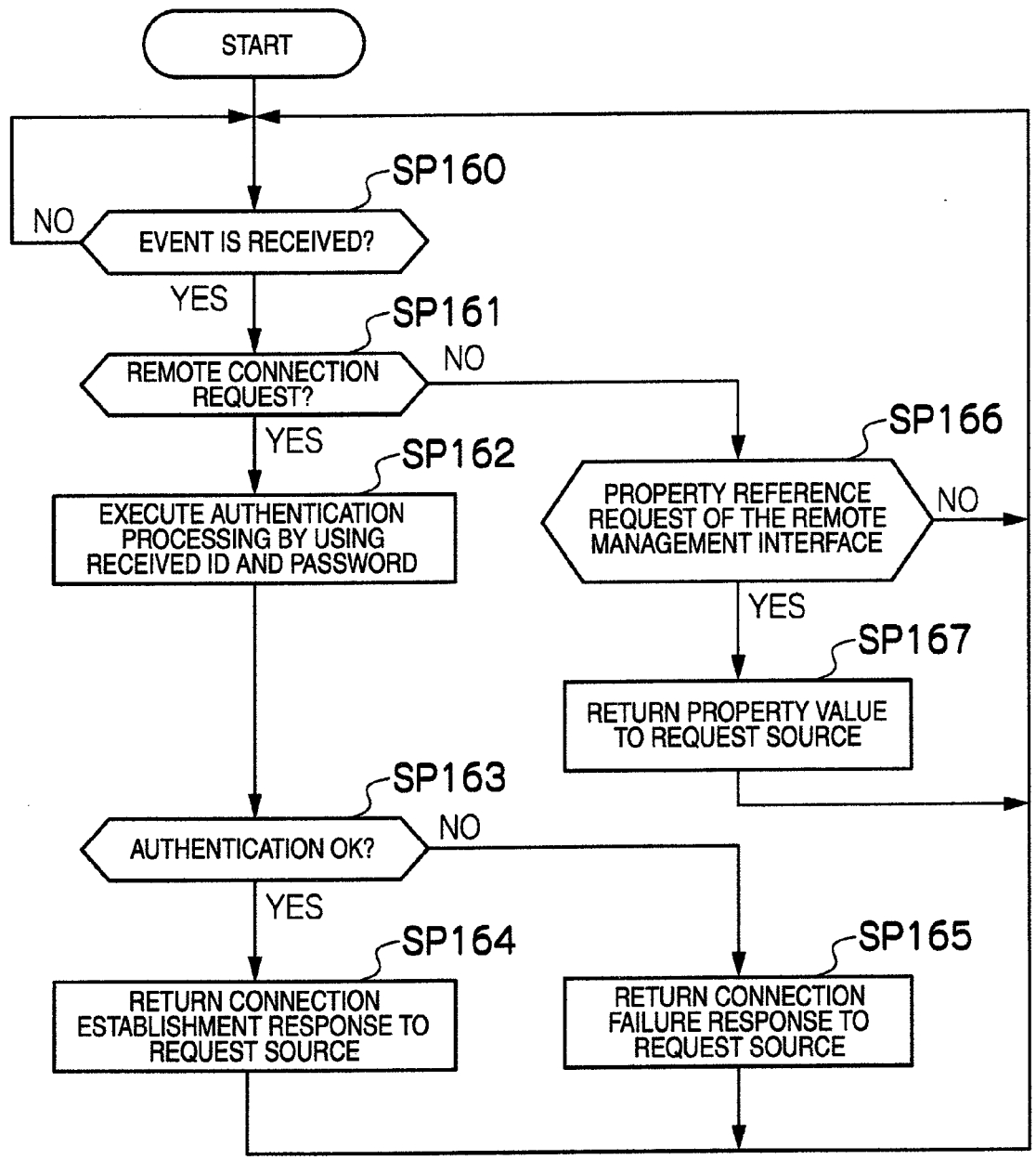
FIG. 20 is a flow chart showing concrete processing contents of an OS in the client concerning the distribution execution processing.

FIG. 20 shows contents of processing conducted by the OS 24 (FIG. 1) in the client 3 which has received the remote connection request transmitted from the management server 2 at the step SP22 in FIG. 9 or which has received a property reference request of the remote management interface 36 (FIG. 1) transmitted from the management server 2 at the step SP25 in FIG. 9.

In this case, the OS 24 waits for occurrence of a predetermined event (SP160). Here, the "event" means that the remote connection request or the property reference request of the remote management interface 36 is received from the management server 2.

If an affirmative result is obtained at step SP160 as a result of occurrence of an event which takes place soon, then the OS 24 makes a decision whether the event which has occurred at that time is that the remote connection request is received from the management server 2 (SP161).

If an affirmative result is obtained in this decision, then the OS 24 executes authentication processing of comparing the received ID and password with the ID and password of the temporary account generated by the script 26 (see the step SP142 in FIG. 18) (SP162), and then makes a decision whether the received ID and password coincide with the ID and password of the temporary account generated by the script 26 (SP163).

If an affirmative result is obtained in this decision, then the OS 24 transmits a remote connection establishment notice to the transmission source (the management server 2) of the remote connection request (SP164). Thereafter, the OS 24 returns to the step SP160.

On the other hand, if a negative result is obtained in the decision at the step SP163, then the OS 24 returns a response to the effect that the remote connection has failed to the transmission source of the remote connection request (SP165) and then the OS24 returns to the step SP160. If a negative result is obtained in the decision at the step SP161, then the OS24 makes a decision whether the event which has occurred at that time is that the property reference request of the remote management interface 36 has been received (SP166).

If a negative result is obtained in this decision, the OS 24 returns to the step SP160. On the other hand, if an affirmative result is obtained in the decision, then the OS 24 transmits a property value (containing the OS information of the client 3) of the remote management interface 36 to the transmission source (management server) of the property reference request (SP167) and then returns to the step SP160.

(1-3) Effects of Present Embodiment

In the information processing system 1 according to the present embodiment, the port in the client 3 is opened or closed only at the distribution time assigned to the client 3, as heretofore described. In time zones other than the distribution time, therefore, the client 3 can be protected from malicious access. As a result, it is possible to distribute highly reliable software (here, an agent program) from the management server 2 to the client 3.

(2) Second Embodiment (2-1) Software Distribution Scheme According to Second Embodiment In FIG. 1, reference numeral 50 denotes an information processing system according to a second embodiment as a whole. The information processing system 50 differs from the information processing system 1 according to the first embodiment in that the distribution time of the agent program can be changed in the client 3.

Figure 21:
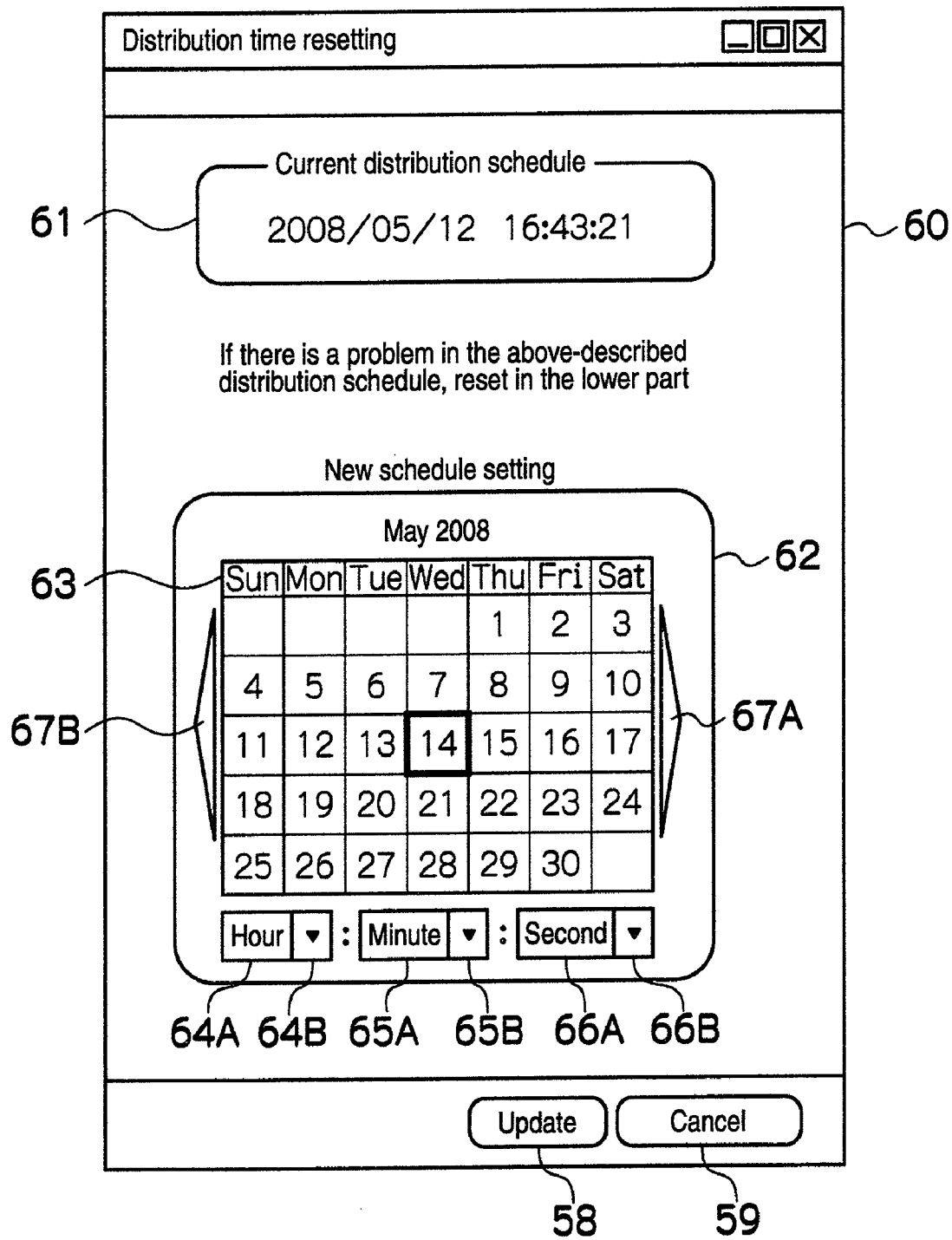
FIG. 21 is a schematic diagram showing a distribution time resetting screen schematically.

As a matter of fact, in the information processing system 50 according to the second embodiment, a distribution time resetting screen 60 shown in FIG. 21 is displayed on the client 3 when the script file is executed in the client 3 according to a user's order at, for example, the step SP5 in the pre-processing described earlier with reference to FIG. 8.

On the distribution time resetting screen 60, distribution time of the agent program given as a notice by a management server 51 (FIG. 1) is displayed in a distribution schedule display part 61 provided on an upper stage of the screen. On the distribution time resetting screen 60, a distribution schedule resetting part 62 is provided on a lower stage of the screen. A calendar 63, an hour setting column 64A, a minute setting column 65A and a second setting column 66A are displayed in the distribution schedule resetting part 62.

In this case, a calendar 63 displayed in the distribution schedule resetting part 62 can be changed to that of the next month by clicking a feed button 67A displayed on the right side of the calendar, and can be changed to that of the last month by clicking a return button 67B displayed on the left side of the calendar.

Thus, the user causes a calendar 63 of a desired month to be displayed in the distribution schedule resetting part 62 by clicking the feed button 67A or the return button 67B as occasion demands. Thereafter, the user clicks a desired day in the calendar 63. As a result, the user can set that day in that month as a distribution day of the agent program.

A pull-down button 64B is provided on the right side of the hour setting column 64A. A pull-down menu (not illustrated) with numerical values in the range of "0" to "23" enumerated can be displayed by clicking the pull-down button 64B. Thus, the user can specify an "hour" in time desired as the distribution time of the agent program from among hours in the pull-down menu. The "hour" specified at this time is displayed in the hour setting column 64A.

A pull-down button 65B is provided on the right side of the minute setting column 65A. A pull-down menu (not illustrated) with numerical values in the range of "0" to "59" enumerated can be displayed by clicking the pull-down button 65B. Thus, the user can specify a "minute" in time desired as the distribution time of the agent program from among minutes in the pull-down menu. The "minute" specified at this time is displayed in the minute setting column 65A.

A pull-down button 66B is provided on the right side of the second setting column 66A. A pull-down menu (not illustrated) with numerical values in the range of "0" to "59" enumerated can be displayed by clicking the pull-down button 66B. Thus, the user can specify a "second" in time desired as the distribution time of the agent program from among seconds in the pull-down menu. The "second" specified at this time is displayed in the second setting column 66A.

After specifying desired date and hour as the distribution time of the agent program as heretofore described, the user clicks an "update" button 58 displayed on a bottom stage of the distribution time resetting screen 60. As a result, the user can reset the date and hour as the distribution time of the agent program. If a "cancel" button 59 is clicked, all manipulations conducted until then are canceled.

If the user resets the distribution time of the agent program as heretofore described, then the client 3 displays a message to prompt the user to have already started the client 3 at the reset time at step SP6 in FIG. 8. When transmitting the script execution completion notice to the management server 51 at the step SP7 in FIG. 8, the client 3 gives a notice of the distribution time of the agent program reset by the user to the management server 51. Thereafter, the client 3 is in a standby state until the reset distribution time of the agent program is reached (the step SP8 in FIG. 8).

Upon receiving the script execution completion notice, the management server 51 changes the distribution time stored in the distribution time column 43F of the corresponding entry in the client management table 43 (FIG. 4) to the distribution time reset by the user of the client 3 and given as a notice together with the script execution completion notice at that time. Thereafter, the management server 51 is brought into the standby state (the step SP10 in FIG. 8).

When implementing such a software distribution processing scheme, the form of the script file template 54 (FIG. 1) and the script file 55 generated on the basis of the script file template 54 according to the second embodiment is slightly different from the form of the script file template 40 and the script file 29 generated on the basis of the script file template 40 according to the first embodiment.

Specifically, the distribution time (DTIME) of the agent program is not a constant, but becomes a global variable. In addition, the distribution time resetting screen 60 is displayed before "Display Message ( )" (which is processing of displaying a message to prompt the user to have already started the client at the distribution time). When resetting of the distribution time of the agent program has been conducted by using the distribution time resetting screen 60, processing of rewriting the value of the distribution time (DTIME) of the agent program is added.

Figure 22:
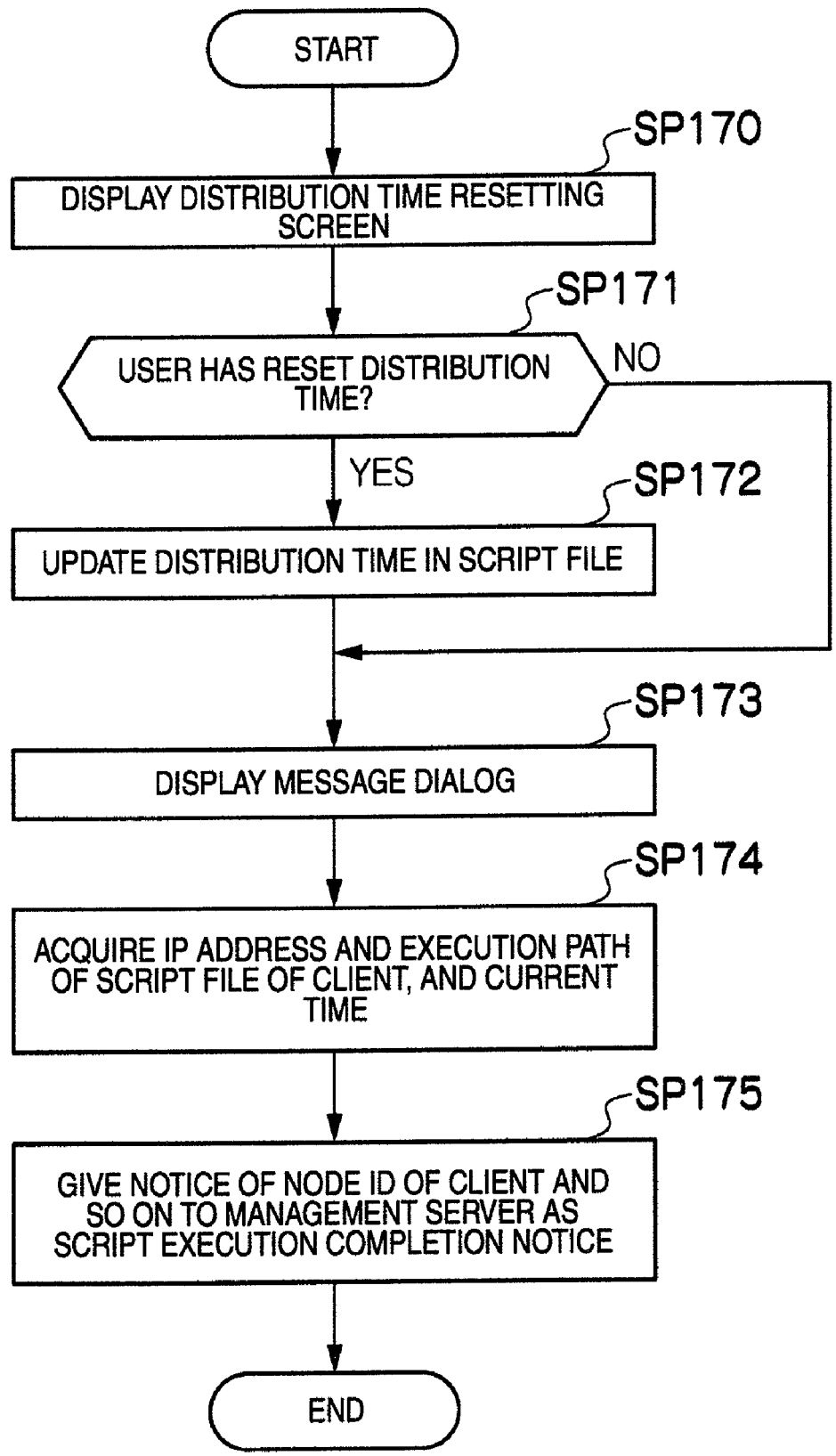
FIG. 22 is a flow chart showing concrete processing contents of a script concerning pre-processing in a software distribution scheme according to a second embodiment.

FIG. 22 shows concrete processing contents of a script 56 (FIG. 1) in the client 3 which has executed the script file 55 (FIG. 1) transmitted from the management server 51 in the software distribution scheme according to the second embodiment heretofore described.

If the user of the client 3 executes the script file 55, then the script 56 starts client-side pre-processing shown in FIG. 22. First, the distribution time resetting screen 60 described above with reference to FIG. 21 is displayed on the client 3 (SP170).

Subsequently, the script 56 waits for the user to reset the distribution time of the agent program by using the distribution time resetting screen 60 (SP171). If the resetting is not conducted (i.e., if the cancel button 59 on the distribution time resetting screen 60 is clicked), then the script 56 proceeds to step SP173.

On the other hand, if the distribution time of the agent program is reset by using the distribution time resetting screen 60 (i.e., if distribution time is specified on the distribution time resetting screen 60 and the "update" button 58 is clicked), then the script 56 updates the distribution time of the agent program in the script file 55 with the time reset by the user (SP172).

Thereafter, the script 56 executes steps SP173 to SP175 in the same way as the steps SP130 to SP132 in the client-side pre-processing according to the first embodiment described earlier with reference to FIG. 17, and then terminates the client-side pre-processing.

Figure 23:
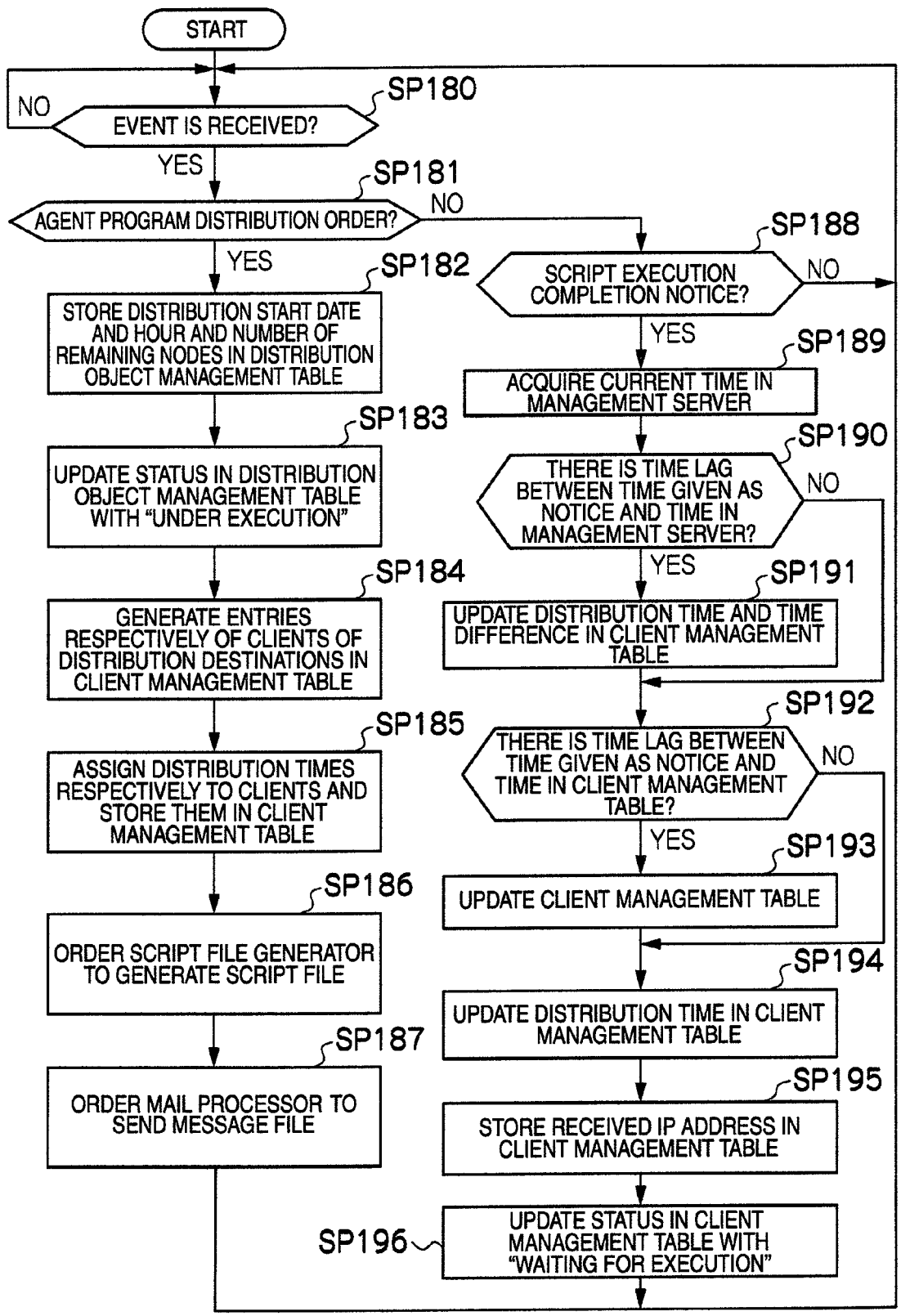
FIG. 23 is a flow chart showing concrete processing contents of a manager controller in a management server concerning pre-processing in the software distribution scheme according to the second embodiment.

FIG. 23 shows concrete processing contents of pre-processing executed by a manager controller 53 in a manager program 52 included in the management server 51, as regards the software distribution scheme according to the present embodiment heretofore described.

In this case, the manager controller 53 first waits for occurrence of a predetermined event (SP180). Here, the "event" means that the above-described agent program distribution order is given by the managing person at the step SP1 in FIG. 8 or the above-described script execution completion notice is given by the client 3 at the step SP7 in FIG. 8.

If an affirmative result is soon obtained at step SP180, then the manager controller 53 makes a decision whether a signal received at that time is an agent program distribution order (SP181).

If an affirmative result is obtained in this decision, then the manager controller 53 executes steps SP182 to SP187 in the same way as the steps SP42 to SP47 of the pre-processing in the first embodiment described earlier with reference to FIG. 10.

On the other hand, if a negative result is obtained in the decision at the step SP181, then the manager controller 53 executes steps SP188 to SP191 in the same way as the steps SP48 to SP51 of the pre-processing shown in FIG. 10.

Thereafter, the manager controller 53 makes a decision whether there is a time lag between the distribution time of the agent program preset in the client 3 and contained in the script execution completion notice sent from the client 3 at that time and the distribution time stored in the distribution time column 43F (FIG. 4) of the corresponding entry in the client management table 43 (FIG. 4) which is retained by the management server 51 (i.e., whether the distribution time of the agent program has been reset) (SP192).

If a negative result is obtained in this decision, the manager controller 53 proceeds to step SP194. On the other hand, if an affirmative result is obtained in the decision, then the manager controller 53 updates the distribution time stored in the distribution time column 43F (FIG. 4) of the corresponding entry in the client management table 43 with the distribution time given by the script execution completion notice which is received at that time (i.e., the distribution time reset by the user of the client 3) (SP193).

Subsequently, the manager controller 53 updates the distribution time updated at the step S193 with time obtained by shifting it by the time difference stored in the time difference column 43G (FIG. 4) of the entry corresponding to the client 3 in the client management table 43 (FIG. 4) (SP194).

Thereafter, the manager controller 53 executes steps SP195 and SP196 in the same way as the steps SP52 and SP53 in the pre-processing shown in FIG. 10, and then returns to the step SP180.

(2-2) Effects of Present Embodiment

In the information processing system 50 according to the present embodiment, it is possible to reset the distribution time on the client 3 side as heretofore described. In addition to the effects brought about by the first embodiment, therefore, it is also possible to obtain an effect that agent program distribution can be conducted with due regard to convenience of the user of the client 3 as in the pull-type distribution scheme.

(3) Other Embodiments

In the first and second embodiments, the case where the distribution object is software (especially an agent program) has been described. However, the present invention is not restricted to this, but the present invention can be applied widely when distributing various other contents. For example, supposing the clients 3 to be storage management servers and the distribution object to be storage management software, it is also possible to distribute the storage management software to the storage management servers.

In the second embodiment, the case where the distribution time resetting screen 60 has the configuration shown in FIG. 21 has been described. However, the present invention is not restricted to this, but various other configurations can be widely applied to the distribution time resetting screen 60.

The present invention can be widely applied to information processing systems of various forms each including a management server and a plurality of clients.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system comprising:
one or more clients; and
a management apparatus which manages the said one or more clients and distributes contents to the said one or more clients,
wherein:
the management apparatus distributes the contents to each of the said one or more clients of a distribution subject of the contents at distribution time assigned to each of the said one or more clients, and
each of the said one or more clients opens a port at the distribution time on the basis of a script having the distribution time prescribed therein, and closes the port after receiving the contents,
wherein the management apparatus assigns the distribution time of the contents to each of the said one or more clients in accordance with distribution start time of the contents specified by external manipulation, and
the management apparatus generates a file of the script which corresponds to each of the said one or more clients and which prescribes the assigned distribution time, and distributes the generated file of the script to the each of the said one or more clients before the distribution time of the contents prescribed in the script,
wherein:
a generation rule of a temporary account is prescribed in the script,
when the distribution time prescribed in the script is reached, the each of the said one or more clients generates authentication information of the temporary account in accordance with the generation rule, and
when the distribution time of the contents for the each of the said one or more clients is reached, the management apparatus generates authentication information of the temporary account in accordance with the same generation rule as the generation rule prescribed in the script which is distributed to the each of the said one or more clients, transmits a remote connection request to the each of the said one or more clients by using the generated authentication information, and distributes the contents to the each of the said one or more clients by using the generated temporary account.

2. The information processing system according to claim 1, wherein the each of the said one or more clients deletes the script after receiving the contents.

3. The information processing system according to claim 2, wherein the each of the said one or more clients deletes the temporary account after receiving the contents.

4. The information processing system according to claim 1, wherein, if the contents are not distributed from the management apparatus within a predetermined timeout time after the port is opened, the each of the said one or more clients closes the port.

5. An information processing method in an information processing system, the information processing system including one or more clients, and a management apparatus which manages the said one or more clients and distributes contents to the said one or more clients, the information processing method comprising:
a first step of causing the management apparatus to distribute the contents to each of the said one or more clients of a distribution subject of the contents at distribution time assigned to the each of the said one or more clients and causing the each of the said one or more clients to open a port at the distribution time on the basis of a script having the distribution time prescribed therein, and
a second step of causing the each of the said one or more clients to close the port after receiving the contents, wherein
a generation rule of a temporary account is prescribed in the script, and at the first step, when the distribution time prescribed in the script is reached, the each of the said one or more clients generates the authentication information of the temporary account in accordance with the generation rule, and when the distribution time of the contents for the each of the said one or more clients is reached, the management apparatus generates the authentication information of the temporary account in accordance with the same generation rule as the generation rule prescribed in the script which is distributed to the each of the said one or more clients, transmits a remote connection request to the each of the said one or more clients by using the generated authentication information, and distributes the contents to the each of the said one or more clients by using the generated temporary account.

6. The information processing method according to claim 5, wherein at the second step, the each of the said one or more clients deletes the script after receiving the contents.

7. The information processing method according to claim 5, wherein at the second step, the each of the said one or more clients deletes the temporary account after receiving the contents.

8. The information processing method according to claim 5, wherein at the second step, if the contents are not distributed from the management apparatus within a predetermined timeout time after the port is opened, the each of the said one or more clients closes the port.

* * * * *